United States Patent
Hasegawa et al.

(10) Patent No.: US 11,256,932 B2
(45) Date of Patent: Feb. 22, 2022

(54) FALLING OBJECT DETECTION APPARATUS, IN-VEHICLE SYSTEM, VEHICLE, AND COMPUTER READABLE MEDIUM

(71) Applicant: Mitsubishi Electric Corporation, Tokyo (JP)

(72) Inventors: Takefumi Hasegawa, Tokyo (JP); Shu Murayama, Tokyo (JP); Masahiro Abukawa, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 16/965,446

(22) PCT Filed: Feb. 2, 2018

(86) PCT No.: PCT/JP2018/003598
§ 371 (c)(1),
(2) Date: Jul. 28, 2020

(87) PCT Pub. No.: WO2019/150552
PCT Pub. Date: Aug. 8, 2019

(65) Prior Publication Data
US 2021/0056322 A1 Feb. 25, 2021

(51) Int. Cl.
*G06K 9/00* (2006.01)
*G06T 7/62* (2017.01)
(Continued)

(52) U.S. Cl.
CPC ......... *G06K 9/00805* (2013.01); *B60W 30/09* (2013.01); *B60W 30/0956* (2013.01);
(Continued)

(58) Field of Classification Search
None
See application file for complete search history.

(56) References Cited

U.S. PATENT DOCUMENTS

2002/0183929 A1* 12/2002 Tsuji ..................... G06T 7/20
701/301
2007/0168128 A1* 7/2007 Tokoro ................. B60R 21/013
701/301
(Continued)

FOREIGN PATENT DOCUMENTS

DE 102014210259 A1 * 12/2015 ......... B60R 21/0134
JP 10-315843 A 12/1998
(Continued)

OTHER PUBLICATIONS

German Office Action for German Application No. 11 2018 006 738.6, dated Jun. 24, 2021, with English translation.
(Continued)

*Primary Examiner* — Delomia L Gilliard
(74) *Attorney, Agent, or Firm* — Birch, Stewart, Kolasch & Birch, LLP

(57) ABSTRACT

An acquisition unit of a falling object detection apparatus installed and used in a first vehicle acquires a depth image of a second vehicle, on which a load is mounted and which is traveling in front of the first vehicle, and of the area around the second vehicle. A determination unit of the falling object detection apparatus determines whether the load has not made a movement different from that of the second vehicle, using the depth image acquired by the acquisition unit. A detection unit of the falling object detection apparatus detects a fall of the load based on a result of determination by the determination unit.

11 Claims, 16 Drawing Sheets

(51) Int. Cl.
| | |
|---|---|
| *G06T 7/50* | (2017.01) |
| *G06T 7/70* | (2017.01) |
| *B60W 30/09* | (2012.01) |
| *B60W 30/095* | (2012.01) |
| *B60W 30/16* | (2020.01) |
| *G01S 13/08* | (2006.01) |
| *G06K 9/32* | (2006.01) |
| *G06T 7/20* | (2017.01) |
| *G01S 13/931* | (2020.01) |
| *G08G 1/16* | (2006.01) |

(52) U.S. Cl.
CPC ............ *B60W 30/16* (2013.01); *G01S 13/08* (2013.01); *G06K 9/3233* (2013.01); *G06T 7/20* (2013.01); *G06T 7/50* (2017.01); *G06T 7/62* (2017.01); *G06T 7/70* (2017.01); *B60W 2420/42* (2013.01); *B60W 2420/52* (2013.01); *B60W 2554/404* (2020.02); *G01S 13/931* (2013.01); *G06T 2207/30261* (2013.01); *G08G 1/16* (2013.01)

(56) References Cited

U.S. PATENT DOCUMENTS

| | | | | |
|---|---|---|---|---|
| 2007/0188128 | A1* | 8/2007 | Blom | H02J 7/0042 320/107 |
| 2010/0007500 | A1* | 1/2010 | Mestres | G08B 13/1427 340/572.4 |
| 2012/0027258 | A1* | 2/2012 | Uchida | G06T 7/20 382/103 |
| 2012/0083960 | A1* | 4/2012 | Zhu | B60T 8/00 701/23 |
| 2014/0266655 | A1* | 9/2014 | Palan | G08G 1/052 340/435 |
| 2018/0144499 | A1* | 5/2018 | Watanabe | G06T 7/593 |
| 2018/0208196 | A1* | 7/2018 | Kurata | G08G 1/165 |
| 2018/0330481 | A1* | 11/2018 | Watanabe | G06T 7/285 |
| 2019/0143989 | A1* | 5/2019 | Oba | H04N 5/23219 701/70 |
| 2020/0255034 | A1* | 8/2020 | Taguchi | B60W 30/143 |
| 2020/0331467 | A1* | 10/2020 | Ohmura | G06K 9/00805 |
| 2020/0331468 | A1* | 10/2020 | Ohmura | B60W 40/04 |
| 2021/0261159 | A1* | 8/2021 | Pazhayampallil | G01S 17/89 |

FOREIGN PATENT DOCUMENTS

| | | |
|---|---|---|
| JP | 2004-9993 A | 1/2004 |
| JP | 2005-18472 A | 1/2005 |
| JP | 2006-82618 A | 3/2006 |
| JP | 2008-305421 A | 12/2008 |
| JP | 2010-108371 A | 5/2010 |
| JP | 2010-257138 A | 11/2010 |
| JP | 2014-67169 A | 4/2014 |
| JP | 2014-232508 A | 12/2014 |
| JP | 2016-11061 A | 1/2016 |

OTHER PUBLICATIONS

Wikipedia, "TOF-Kamera", The Free Encyclopedia, URL: https://de.wikipedia.org/w/index.php?title=TOFKamera&oldid=169351574#Automobile_Anwendungen, accessed on Jun. 23, 2021, (13 pages) with English translation.

Castorena et al., "Autocalibration of LIDAR and Optical Cameras via Edge Alignment", 2016 IEEE International Conference on Acoustics, Speech, and Signal Processing (ICASSP), Mitsubishi Electric Research Laboratories, TR2016-009, Mar. 20, 2016, pp. 1-8.

Farnebäck, Two-Frame Motion Estimation Based on Polynomial Expansion, Computer Vision Laboratory, Linkoping University, Jun. 24, 2003, pp. 1-9.

International Search Report issued in PCT/JP2018/003598 (PCT/ISA/210), dated Apr. 10, 2018.

Saneyoshi, "Drive Assist System of a Car by means of Stereo Vision", Information Processing Society of Japan Technical Report, vol. 2013-CVIM-185, No. 20, Jan. 23, 2013, pp. 1-9.

\* cited by examiner

FALLING OBJECT DETECTION APPARATUS, IN-VEHICLE SYSTEM, VEHICLE, AND COMPUTER READABLE MEDIUM

TECHNICAL FIELD

The present invention relates to a falling object detection apparatus, an in-vehicle system, a vehicle, and a falling object detection program.

BACKGROUND ART

Patent Literature 1 discloses a technology in which when a vehicle equipped with a millimeter wave sensor and a camera and having an ACC function detects, with the camera, a stationary object such as a load located between the vehicle and a preceding vehicle to be a target of ACC, driving with cruise control by the ACC function is stopped or restricted. "ACC" is an abbreviation for Adaptive Cruise Control.

CITATION LIST

Patent Literature

Patent Literature 1: JP 2016-011061 A

Non-Patent Literature

Non-Patent Literature 1: Castorena, J.; Kamilov, U.; Boufounos, P. T., "Autocalibration of LIDAR and Optical Cameras via Edge Alignment", Mitsubishi Electric Research Laboratories, TR2016-009, March 2016

Non-Patent Literature 2: Keiji Saneyoshi, "Drive Assist System of a Car by means of Stereo Vision", Information Processing Society of Japan Technical Report, Vol. 2013-CVIM-185 No. 20, Jan. 23, 2013

Non-Patent Literature 3: Gunnar Farneback, "Two-Frame Motion Estimation Based on Polynomial Expansion", Computer Vision Laboratory, Linkoping University, 2003

SUMMARY OF INVENTION

Technical Problem

In the existing technology, a load that has fallen can only be detected. That is, a fall of a load cannot be immediately detected. For this reason, when the inter-vehicle distance to a preceding vehicle is short, there is a high probability that the vehicle with the ACC function will not have enough time to steer clear of the load and will collide with the load.

It is an object of the present invention to immediately detect a fall of a load from a preceding vehicle.

Solution to Problem

A falling object detection apparatus according to one aspect of the present invention is installed and used in a first vehicle, and includes an acquisition unit to acquire a depth image of a second vehicle, on which a load is mounted and which is traveling in front of the first vehicle, and of an area around the second vehicle;

a determination unit to determine whether the load has not made a movement different from a movement of the second vehicle, using the depth image acquired by the acquisition unit; and a detection unit to detect a fall of the load based on a result of determination by the determination unit.

Advantageous Effects of Invention

In the present invention, a fall of a load is detected based on the result of determination as to whether a load on a preceding vehicle has not made a movement different from that of the preceding vehicle, using a depth image of the preceding vehicle and of the area around the preceding vehicle. Therefore, a fall of the load from the preceding vehicle can be immediately detected.

DESCRIPTION OF EMBODIMENTS

Embodiments of the present invention will be described hereinafter with reference to the drawings. Throughout the drawings, the same or corresponding portions are denoted by the same reference signs. In the description of the embodiments, description of the same or equivalent portions will be suitably omitted or simplified. Note that the present invention is not limited to the embodiments to be described hereinafter, and various modifications are possible as necessary. For example, two or more of the embodiments to be described hereinafter may be implemented in combination. Alternatively, one embodiment or a combination of two or more embodiments of the embodiments to be described hereinafter may be partially implemented.

First Embodiment

Referring to FIGS. 1 to 4, this embodiment will be described.

Description of Configuration

Figure 1:
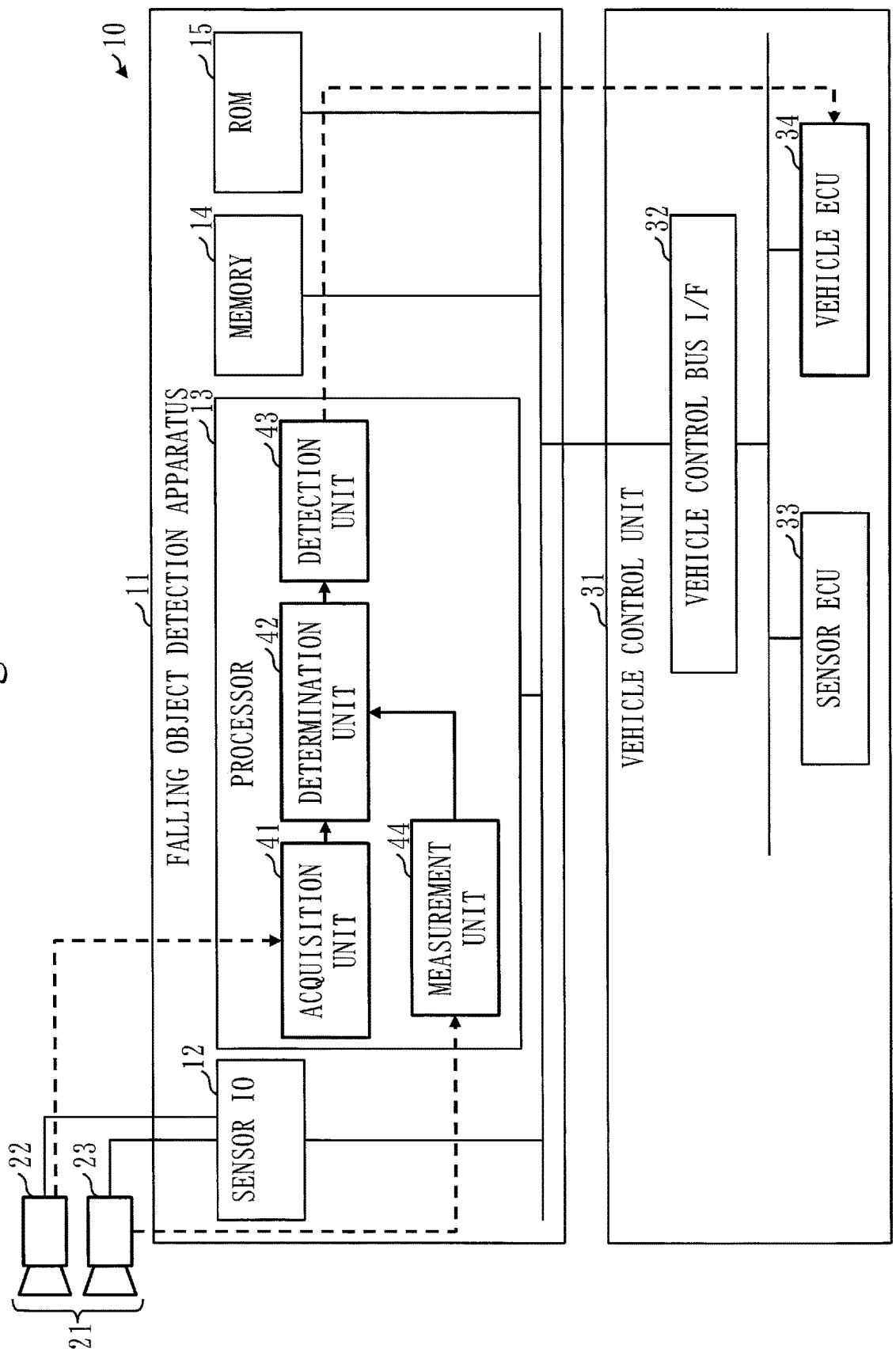
FIG. 1 is a block diagram illustrating a configuration of an in-vehicle system including a falling object detection apparatus according to a first embodiment.

Referring to FIG. 1, a configuration of an in-vehicle system 10 including a falling object detection apparatus 11 according to this embodiment will be described.

The in-vehicle system 10 includes the falling object detection apparatus 11, sensor devices 21, and a vehicle control unit 31.

The falling object detection apparatus 11 is a computer. The falling object detection apparatus 11, which is a commonly used computer in this embodiment, may be an embedded device or an ECU. "ECU" is an abbreviation for Electronic Control Unit.

The falling object detection apparatus 11 includes a processor 13, and also includes other hardware components, such as a sensor IO 12, a memory 14, and a ROM 15. "IO" is an abbreviation for Input/Output. The processor 13 is connected with the other hardware components via signal lines, and controls the other hardware components.

The falling object detection apparatus 11 includes, as functional elements, an acquisition unit 41, a determination unit 42, a detection unit 43, and a measurement unit 44. The functions of the acquisition unit 41, the determination unit 42, the detection unit 43, and the measurement unit 44 are realized by software.

The processor 13 is a device that executes a falling object detection program. The falling object detection program is a program for realizing the functions of the acquisition unit 41, the determination unit 42, the detection unit 43, and the measurement unit 44. The processor 13, which is a CPU in this embodiment, may be a GPU or a combination of a CPU and a GPU. "CPU" is an abbreviation for Central Processing Unit. "GPU" is an abbreviation for Graphics Processing Unit.

The memory 14 and the ROM 15 are devices to store the falling object detection program. "ROM" is an abbreviation for Read Only Memory. The memory 14 is, for example, a RAM, a flash memory, or a combination of these. "RAM" is an abbreviation for Random Access Memory.

The falling object detection apparatus 11 may further include, as hardware, a communication device, an input device, and a display.

The communication device includes a receiver to receive data input to the falling object detection program and a transmitter to transmit data output from the falling object detection program. The communication device is, for example, a communication chip or a NIC. "NIC" is an abbreviation for Network Interface Card.

The input device is a device that is operated by a user to input data to the falling object detection program. The input device is, for example, a touch panel.

The display is a device to display data output from the falling object detection program on a screen. The display is, for example, an LCD. "LCD" is an abbreviation for Liquid Crystal Display.

The falling object detection program is loaded from the ROM 15 into the memory 14, read from the memory 14 into the processor 13, and executed by the processor 13.

The falling object detection apparatus 11 may include a plurality of processors as an alternative to the processor 13. These processors share the execution of the falling object detection program. Each of the processors is, for example, a CPU, a GPU, a DSP, or a combination of any ones or all of these.

Data, information, signal values, and variable values that are used, processed, or output by the falling object detection program are stored in the memory 14, or stored in a register or a cache memory in the processor 13.

The falling object detection program is a program for causing a computer to execute the processes performed by the acquisition unit 41, the determination unit 42, the detection unit 43, and the measurement unit 44, respectively, as an acquisition process, a determination process, a detection process, and a measurement process. The falling object detection program may be recorded and provided on a computer readable medium, may be stored and provided on a recording medium, or may be provided as a program product.

The falling object detection apparatus 11 may be composed of one computer, or may be composed of a plurality of computers. When the falling object detection apparatus 11 is composed of a plurality of computers, the functions of the acquisition unit 41, the determination unit 42, the detection unit 43, and the measurement unit 44 may be distributed among and realized by the plurality of computers.

The sensor devices 21 include at least a depth sensor 22 and a distance sensor 23. The depth sensor 22 is, for example, a stereo camera or a combination of a monocular camera and a LiDAR sensor. "LiDAR" is an abbreviation for Light Detection and Ranging. The distance sensor 23, which is a millimeter wave sensor in this embodiment, may be a radar sensor of a different type. The sensor devices 21 may further include other in-vehicle devices, such as a camera and a sonar.

The vehicle control unit 31 includes a vehicle control bus interface 32, a sensor ECU 33, and a vehicle ECU 34.

The vehicle control bus interface 32 is an interface for communication between the falling object detection apparatus 11, the sensor ECU 33, and the vehicle ECU 34.

The sensor ECU 33 is an ECU to process data obtained from the sensor devices 21.

The vehicle ECU 34 is an ECU to control a vehicle.

Description of Operation

Referring to FIG. 1 and also FIGS. 2 to 4, operation of the falling object detection apparatus 11 according to this embodiment will be described. The operation of the falling object detection apparatus 11 is equivalent to a falling object detection method according to this embodiment.

The falling object detection apparatus 11 is installed and used in a first vehicle 51. The first vehicle 51 is an automated driving vehicle. The in-vehicle system 10 including the falling object detection apparatus 11 is a system installed in the first vehicle 51. The vehicle control unit 31 of the in-vehicle system 10 controls driving of the first vehicle 51.

The falling object detection apparatus 11 connects with the sensor devices 21, which are in-vehicle sensors, via the sensor IO 12. Through this arrangement, sensing data of the area in front of the first vehicle 51 measured by the sensor devices 21 is input to the falling object detection apparatus 11.

The falling object detection apparatus 11 calculates a depth image 61 based on sensing data from the depth sensor 22 of the first vehicle 51, and compares the depth image 61 with different sensor information so as to separate a second vehicle 52 and a load 53, thereby immediately detecting the load 53 that has fallen from the second vehicle 52. The second vehicle 52 is a vehicle on which the load 53 is mounted and which is traveling in front of the first vehicle 51, that is, a preceding vehicle.

The falling object detection apparatus 11 connects with the vehicle control unit 31 via the vehicle control bus interface 32. Through this arrangement, position information and motion information of a falling object detected by the falling object detection apparatus 11 are output to the vehicle control unit 31.

In this embodiment, the falling object detection apparatus 11 refers to changes in the depth image 61 as well as distance information from the distance sensor 23, which is a millimeter wave sensor, so as to determine the separation between the second vehicle 52 and the load 53. With this arrangement, even when the load 53 falls from the second vehicle 52, the load 53 that is falling or may fall can be immediately detected so that the first vehicle 51 avoids this falling object.

When the falling object detection apparatus 11 has detected that the load 53 has fallen from the second vehicle 52 traveling in front of the first vehicle 51, the vehicle control unit 31 controls the brakes of the first vehicle 51 to avoid collision with the load 53 that has fallen. The vehicle control unit 31 may avoid collision with the load 53 not only by controlling the brakes of the first vehicle 51 but also by making a lane change.

The operation of the falling object detection apparatus 11 will be described in detail.

Figure 2:
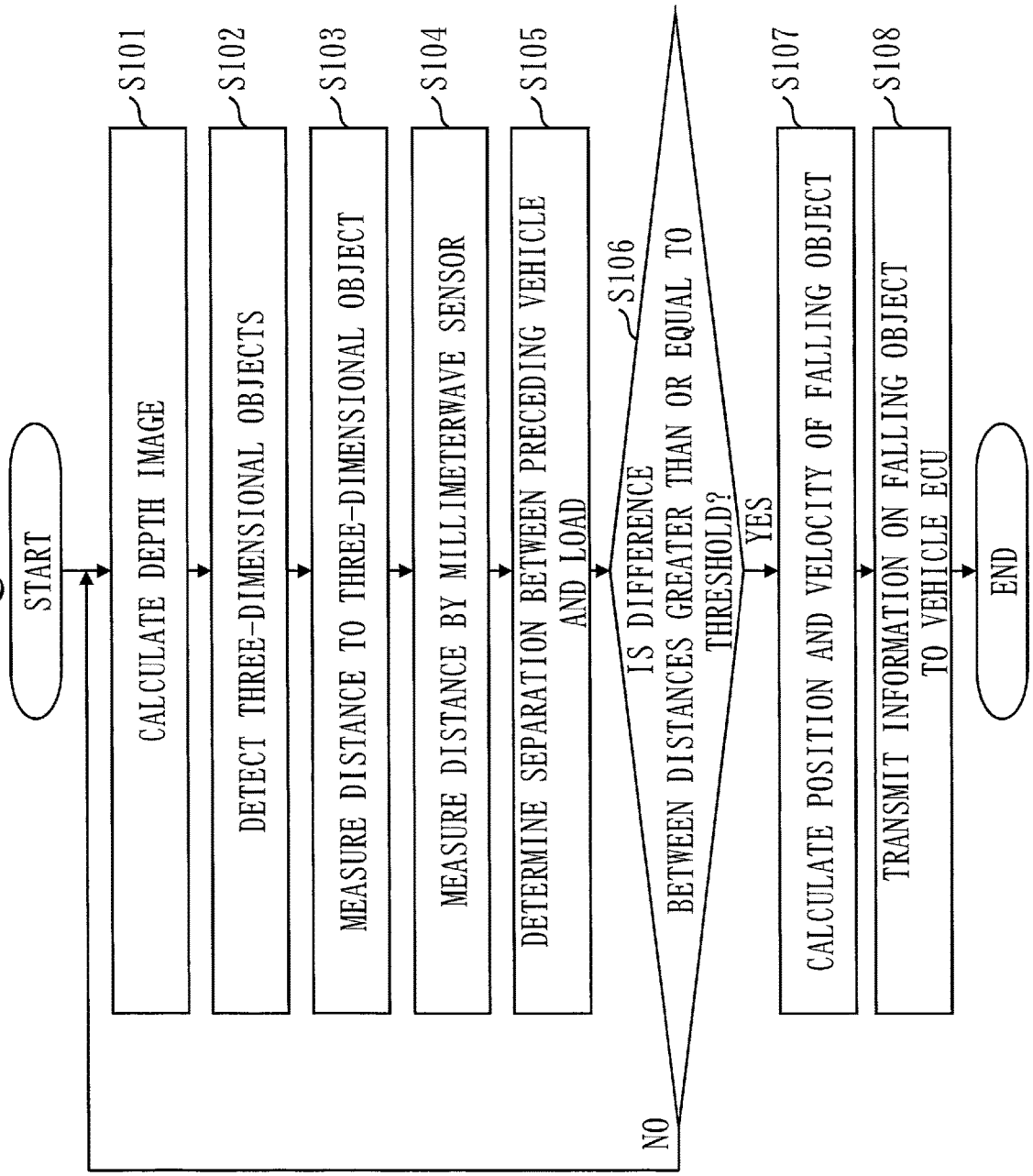
FIG. 2 is a flowchart illustrating operation of the falling object detection apparatus according to the first embodiment.

In step S101 of FIG. 2, the acquisition unit 41 acquires a depth image 61 of the second vehicle 52 and of the area around the second vehicle 52.

In steps S102 to S106 of FIG. 2, the determination unit 42 determines whether the load 53 has not made a movement different from that of the second vehicle 52, using the depth image 61 acquired by the acquisition unit 41. Specifically, in steps S102 and S103, the determination unit 42 refers to the depth image 61 to calculate the distance to the nearest object excluding the road. In step S104, the measurement unit 44 measures the distance to the second vehicle 52, using the distance sensor 23. In this embodiment, the measurement unit 44 measures the distance to the second vehicle 52, using a millimeter wave sensor as the distance sensor 23. In steps S105 and S106, the determination unit 42 compares the calculated distance with the distance measured by the measurement unit 44, and when a difference between the distances exceeds a threshold, determines that the load 53 has made a movement to separate from the second vehicle 52 as the "movement different from that of the second vehicle 52".

In steps S107 and S108 of FIG. 2, the detection unit 43 detects a fall of the load 53 based on the result of determination by the determination unit 42.

The operation of the falling object detection apparatus 11 will be described more specifically.

In step S101, the acquisition unit 41 calculates the depth image 61 of the area in front of the first vehicle 51, using the depth sensor 22 out of the sensor devices 21.

When the depth sensor 22 used to calculate the depth image 61 is a stereo camera, the acquisition unit 41 compares an image captured by one camera with an image captured by the other camera to look for a point with the same feature in each of the captured images, and refers to a gap between the positions of the feature points to calculate distance information, that is, a depth value of the feature point. The acquisition unit 41 generates the depth image 61 by calculating a depth value for each pixel of the captured image.

When the depth sensor 22 used to calculate the depth image 61 is a combination of a monocular camera and a LiDAR sensor, the acquisition unit 41 uses 3D point cloud information measured by the LiDAR sensor as a basis to calculate the depth image 61 based on a fusion result between the monocular camera and the LiDAR sensor. Since the 3D point cloud information of the LiDAR sensor has a low measurement resolution, the acquisition unit 41 refers to boundary region information, that is, edge information of objects captured in the image captured by the monocular camera, so as to perform interpolation on the 3D cloud information. The acquisition unit 41 calculates the depth image 61 based on the 3D point cloud information with the measurement resolution that has been improved by interpolation. As a specific technique, a technique described in Non-Patent Literature 1 can be used.

The depth sensor 22 may be a flash LiDAR with a high measurement resolution.

In step S102, the determination unit 42 refers to the depth image 61 calculated in step S101 to separate image regions of three-dimensional objects and an image region of a road surface, thereby detecting the three-dimensional objects.

In step S103, the determination unit 42 measures the distance to a three-dimensional object nearest to the first vehicle 51 out of the three-dimensional objects detected in step S102.

Figure 3:
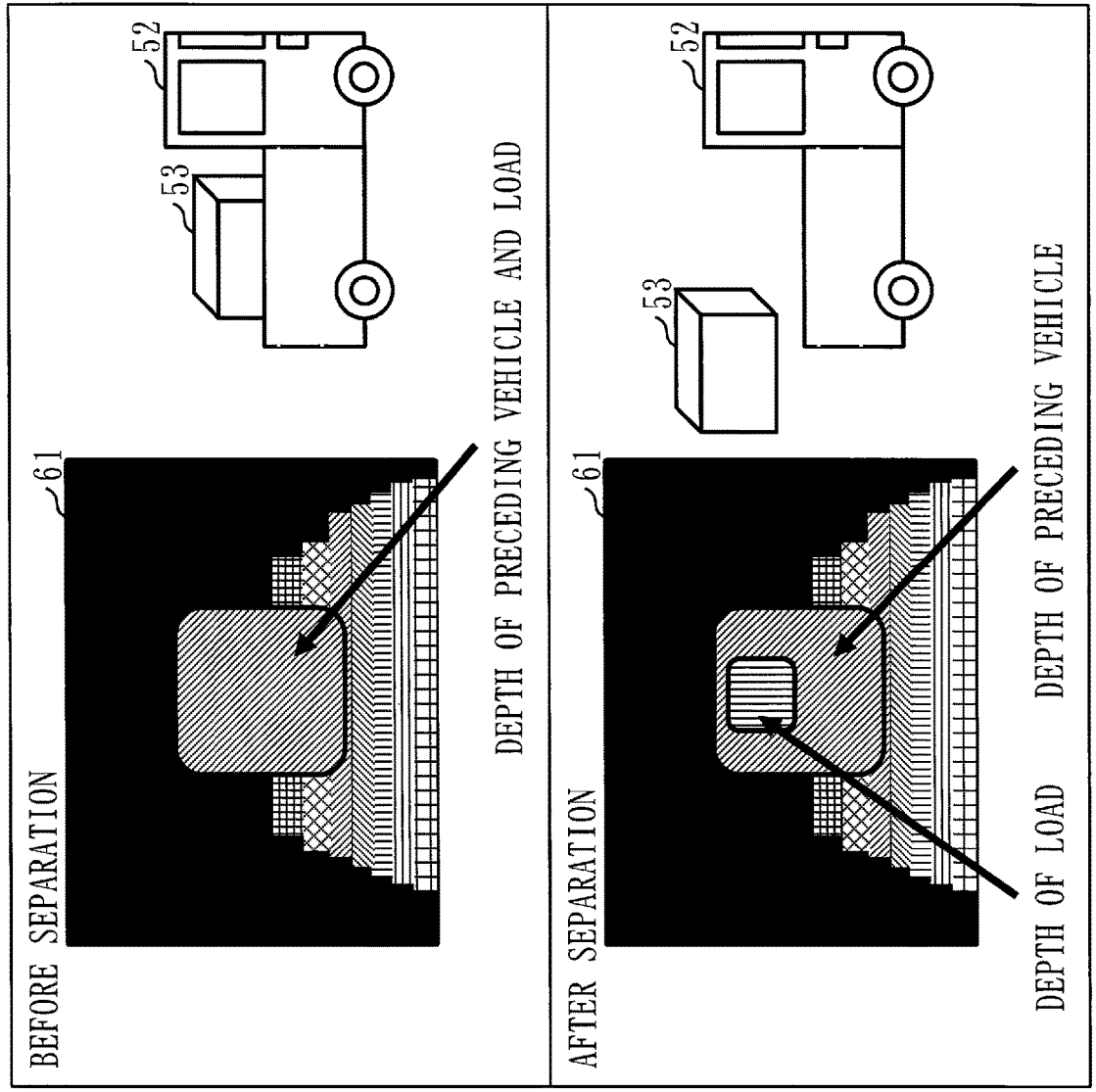
FIG. 3 is a diagram illustrating examples of a depth image according to the first embodiment.
Figure 4:
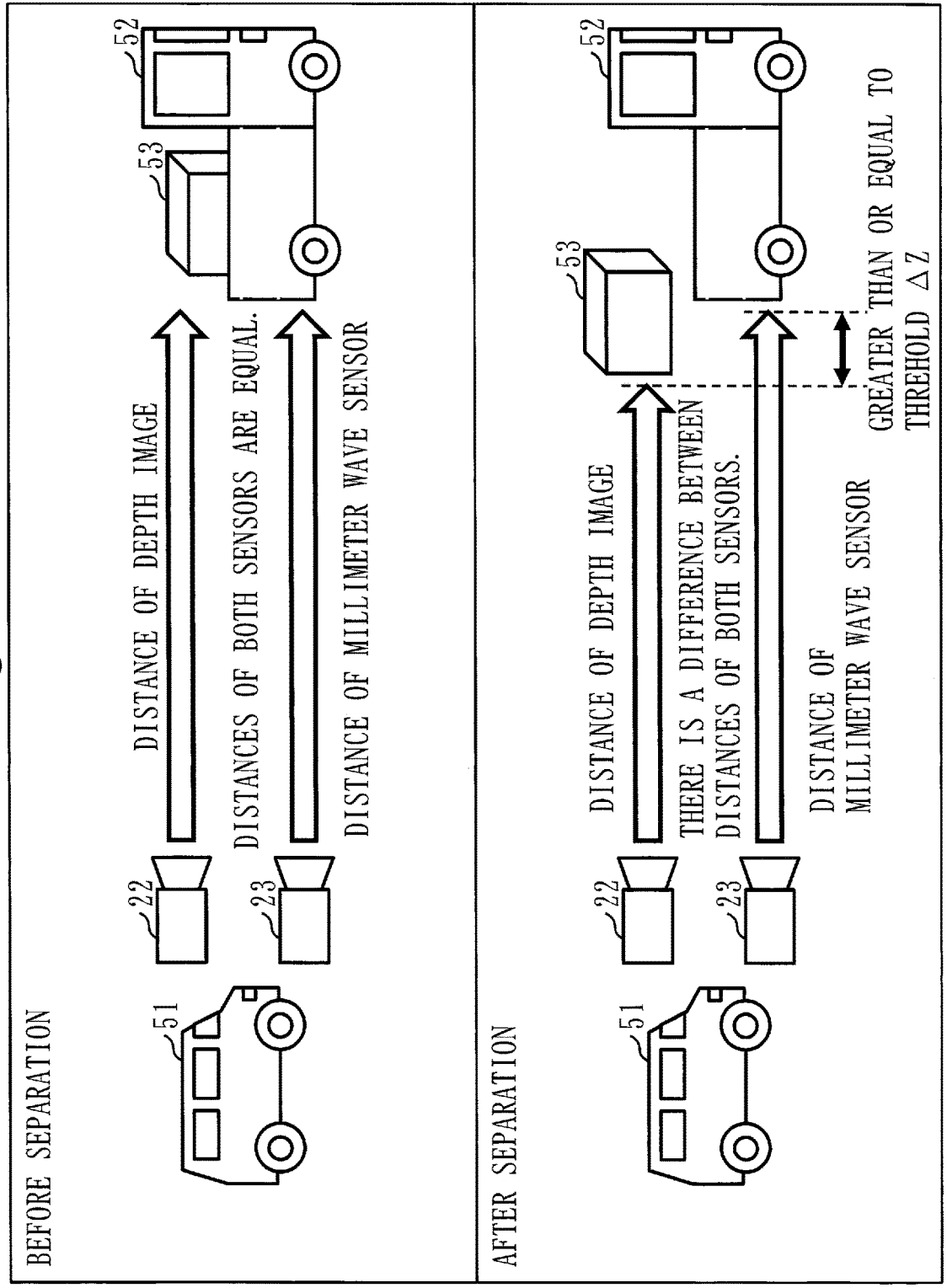
FIG. 4 is a diagram illustrating results of distance measurements by a depth sensor and a distance sensor according to the first embodiment.

FIG. 3 illustrates examples of the depth image 61. In these examples, the pixels of the depth image 61 are displayed in colors that vary depending on the distance. The colors are indicated by hatching patterns for convenience. At the bottom of the depth image 61, the distance to the road surface at a short distance from the first vehicle 51 is measured, so that the color of pixels is a color representing a short distance. In upper portions of the image, the distances from the first vehicle 51 to the road surface are longer, so that the colors of pixels change to colors representing longer distances in the upper portions. In the depth image 61, pixels in the image region representing the second vehicle 52 are approximately at equal distances, thereby having the same color. Note that pixels for which the distance cannot be measured are displayed in black.

The upper diagram in FIG. 3 illustrates the depth image 61 before the separation between the second vehicle 52 and the load 53. Before the separation, the distance to the second vehicle 52 and the distance to the load 53 are approximately equal, so that the colors of pixels are also approximately equal. The lower diagram in FIG. 3 illustrates the depth image 61 after the separation between the second vehicle 52 and the load 53. After the separation, the distance to the second vehicle 52 and the distance to the load 53 are different, so that the color of pixels corresponding to a region where the load 53 is captured is different from the color of pixels of the second vehicle 52.

In a process to detect the image region representing the second vehicle 52, a three-dimensional object is detected from the depth image 61, an image region of the three-dimensional object and an image region of the road surface are separated, and the image region of the three-dimensional object is determined as the image region of the second vehicle 52. Note that when the size of the image region of the three-dimensional object is small and different from the size of the vehicle, the three-dimensional object may be determined not to be the second vehicle 52.

In this embodiment, the distance of a pixel nearest to the first vehicle 51 in image regions determined as three-dimensional objects is treated as the distance of the depth image 61. When the second vehicle 52 and the load 53 are separated, the load 53 is nearest to the first vehicle 51, so that the distance of the depth image 61 indicates the distance to the load 53. As a method for detecting three-dimensional objects in the depth image 61, a method described in Non-Patent Literature 2 can be used.

In step S104, the measurement unit 44 calculates the distance to the second vehicle 52 in front of the first vehicle 51, using the millimeter wave sensor out of the sensor devices 21.

The millimeter wave sensor outputs a millimeter wave, which is an electromagnetic wave with a short wavelength, and receives the electromagnetic wave reflected off an object such as the second vehicle 52, thereby measuring the distance to the object. Millimeter waves reflect strongly off objects containing metal. Therefore, the millimeter wave sensor detects the second vehicle 52, but does not detect an object not containing metal, such as a cardboard box. Even when the load 53 suddenly falls from the second vehicle 52, if the load 53 is an object not containing metal, such as a cardboard box, the millimeter wave sensor will not detect the load 53 and will measure the distance to the second vehicle 52 in front of the load 53.

In step S105, the determination unit 42 starts a process to determine the separation between the second vehicle 52 and the load 53, and compares the distance of the depth image 61 measured in step S103 with the distance of the millimeter wave sensor measured in step S104.

The distance of the depth image 61 is the distance to the object nearest to the first vehicle 51, whereas the distance of the millimeter wave sensor is the distance to the second vehicle 52 containing metal. In actuality, due to the effect of a tracking process of the millimeter wave sensor, if the second vehicle 52 has been detected before the load 53 falls, the previous detection result is referred to even after the load 53 falls, so that there is a high probability that the second vehicle 52 will continue to be detected. Thus, as illustrated in FIG. 4, when the second vehicle 52 and the load 53 are not separated, the distance of the depth image 61 and the distance of the millimeter wave sensor are equal, whereas when the second vehicle 52 and the load 53 are separated, there is a difference between the distance of the depth image 61 and the distance of the millimeter wave sensor.

In step S106, if the difference between the two distances compared in step S105 is greater than or equal to any given threshold $\Delta Z$, the determination unit 42 determines that the second vehicle 52 and the load 53 are separated and proceeds to step S107. If the difference in the distances is smaller than the threshold, the determination unit 42 determines that the second vehicle 52 and the load 53 are not separated and returns to step S101.

The threshold $\Delta Z$ may be any value, and is preferably to be set according to the distance measurement accuracy of the sensor. For example, the threshold $\Delta Z$ may be set to about 0.5 m.

In step S107, based on the result of separation determination in step S106, the detection unit 43 calculates the position and velocity of the load 53, which is a falling object. The position of the load 53 is calculated based on the depth image 61 acquired in step S101 and the distance to the three-dimensional object measured in step S103. The position in a Z-axis direction can be calculated based on the distance in step S103, and the positions in an X-axis direction and a Y-axis direction can be calculated based on the depth image 61 and the distance information in step S101. The X-axis direction corresponds to a lateral direction of the vehicle, the Y-axis direction corresponds to a height direction of the vehicle, and the Z-axis direction corresponds to a traveling direction of the vehicle. The velocity of the load 53 is calculated based on the velocity of the first vehicle 51 and time-series information on the position of the load 53.

In step S108, the detection unit 43 transmits, to the vehicle ECU 34, information on the position and velocity of the load 53, which is a falling object, calculated in step S107.

The vehicle ECU 34 refers to the information on the position and velocity of the falling object transmitted in step S108, and reduces the velocity of the first vehicle 51 or changes the traveling direction by steering, such as making a lane change, in order to avoid collision with this falling object. Note that this function of the vehicle ECU 34 may be realized by the falling object detection program as a function of a control unit. That is, the falling object detection apparatus 11 may further include the control unit to control the motion of the first vehicle 51 according to the position and velocity of the load 53 calculated by the detection unit 43.

With the above operation, even when the load 53 falls from the second vehicle 52, the load 53 that is falling can be immediately detected, so that collision with the falling object can be avoided.

Note that in steps S107 and S108, the detection unit 43 may calculate not only the position and velocity of the load 53 but also the size and direction of motion of the load 53 based on the depth image 61, and information on the position, size, velocity of motion, and direction of motion of the load 53 may be transmitted to the vehicle ECU 34.

When transmitting information to the vehicle ECU 34, the detection unit 43 may determine the accuracy of the information and transmit the result of accuracy determination together with the information.

Description of Effects of Embodiment

In this embodiment, a fall of the load 53 is detected based on the result of determination as to whether the load 53 on the preceding vehicle has not made a movement different from that of the preceding vehicle, using the depth image 61 of the preceding vehicle and the area around the preceding vehicle. Therefore, a fall of the load 53 from the preceding vehicle can be immediately detected.

In this embodiment, the load 53 that is falling or may fall is detected, thereby immediately detecting a fall of the load. This allows traveling to avoid the load 53 falling from the second vehicle 52 even when the inter-vehicle distance between the first vehicle 51 and the second vehicle 52 is short. Note that when the load 53 with a high probability of falling is detected, the velocity of the first vehicle 51 may be reduced to increase the inter-vehicle distance to the second vehicle 52.

In this embodiment, the determination unit 42 determines the separation between the second vehicle 52 and the load 53, using the characteristics of reflection intensity of the millimeter wave sensor. Since the millimeter wave sensor reacts strongly to metals, even when the load 53 not containing metal, such as a cardboard box, falls from the second vehicle 52, the millimeter wave sensor does not react to the load 53 and detects the second vehicle 52. Therefore, the measurement unit 44 outputs the distance to the second vehicle 52. On the other hand, the depth sensor 22 such as a stereo camera detects the load 53 that has fallen from the second vehicle 52, and thus outputs the distance to the load 53. By comparing the distances of the two types of sensors, the separation between the second vehicle 52 and the load 53 can be determined.

In this embodiment, the detection unit 43 refers to the result of separation determination by the determination unit 42, so that a fall of the load 53 can be determined even in a situation where the load 53 has moved by impact after the fall.

According to this embodiment, it is possible to provide an automated driving vehicle that can avoid collision with the load 53 even when the load 53 suddenly falls from the preceding vehicle by immediately detecting the load 53 that is falling from the preceding vehicle or the load 53 with a high probability of falling.

Other Configurations

In this embodiment, the functions of the acquisition unit 41, the determination unit 42, the detection unit 43, and the measurement unit 44 are realized by software. As a variation, however, the functions of the acquisition unit 41, the determination unit 42, the detection unit 43, and the measurement unit 44 may be realized by hardware. With regard to this variation, differences from this embodiment will be mainly described.

Figure 5:
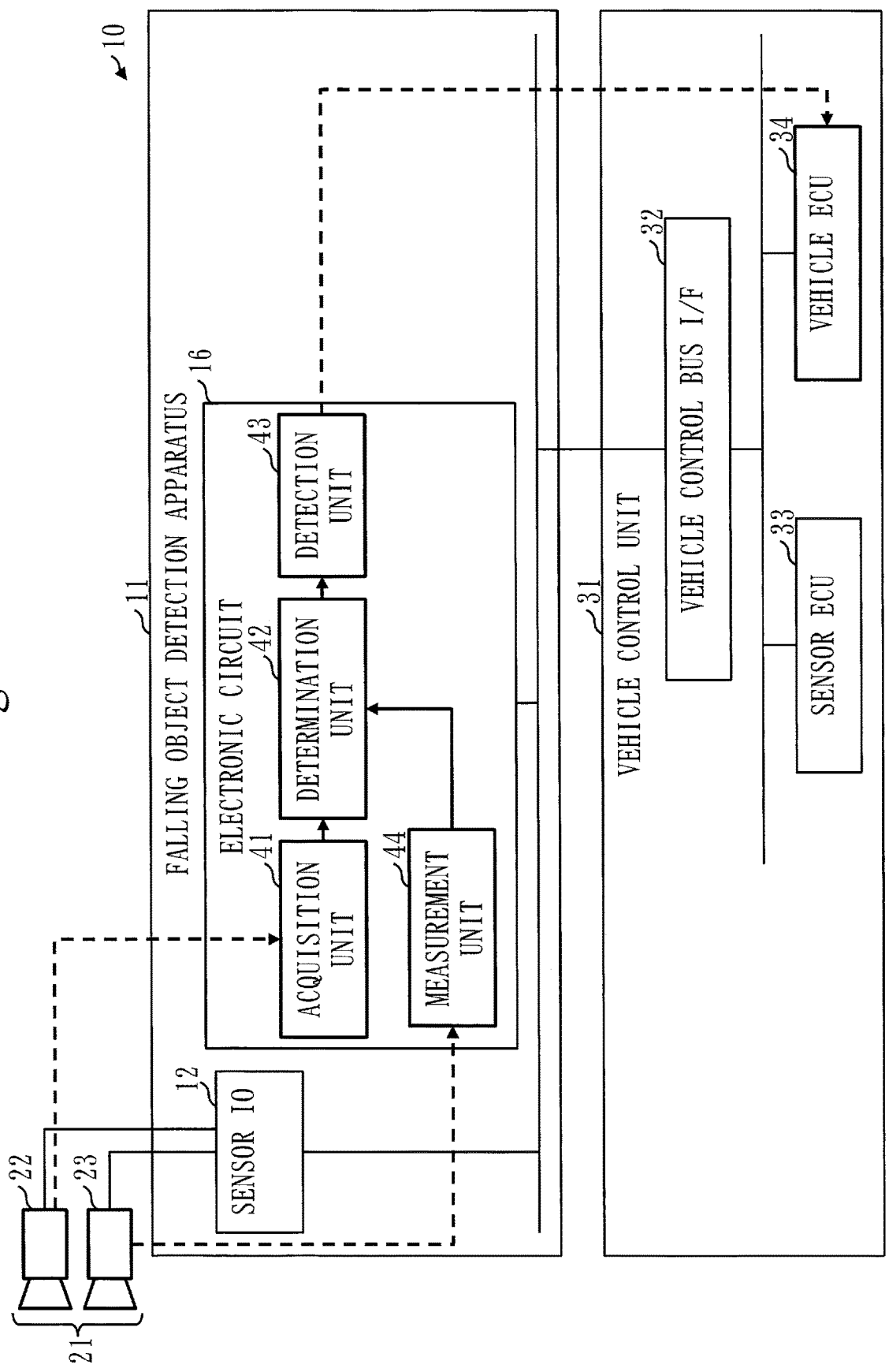
FIG. 5 is a block diagram illustrating a configuration of the in-vehicle system including the falling object detection apparatus according to a variation of the first embodiment.

Referring to FIG. 5, a configuration of the in-vehicle system 10 including the falling object detection apparatus 11 according to the variation of this embodiment will be described.

In this variation, the falling object detection apparatus 11 includes hardware, such as an electronic circuit 16 and the sensor IO 12.

The electronic circuit 16 is dedicated hardware that realizes the functions of the acquisition unit 41, the determination unit 42, the detection unit 43, and the measurement unit 44. The electronic circuit 16 is, for example, a single circuit, a composite circuit, a programmed processor, a parallel-programmed processor, a logic IC, a GA, an FPGA, an ASIC, or a combination of some or all of these. "IC" is an abbreviation for Integrated Circuit. "GA" is an abbreviation for Gate Array. "FPGA" is an abbreviation for Field-Programmable Gate Array. "ASIC" is an abbreviation for Application Specific Integrated Circuit.

The falling object detection apparatus 11 may include a plurality of electronic circuits as an alternative to the electronic circuit 16. These electronic circuits, as a whole, realize the functions of the acquisition unit 41, the determination unit 42, the detection unit 43, and the measurement unit 44. Each of the electronic circuits is, for example, a single circuit, a composite circuit, a programmed processor, a parallel-programmed processor, a logic IC, a GA, an FPGA, an ASIC, or a combination of some or all of these.

As another variation, the functions of the acquisition unit 41, the determination unit 42, the detection unit 43, and the measurement unit 44 may be realized by a combination of software and hardware. That is, some of the functions of the acquisition unit 41, the determination unit 42, the detection unit 43, and the measurement unit 44 may be realized by the dedicated hardware, and the rest of the functions may be realized by software.

The processor 13 and the electronic circuit 16 are both processing circuitry. That is, the operation of the acquisition unit 41, the determination unit 42, the detection unit 43, and the measurement unit 44 is performed by the processing circuitry, regardless of whether the configuration of the falling object detection apparatus 11 is either of the configurations illustrated in FIGS. 1 and 5.

Second Embodiment

Figure 6:
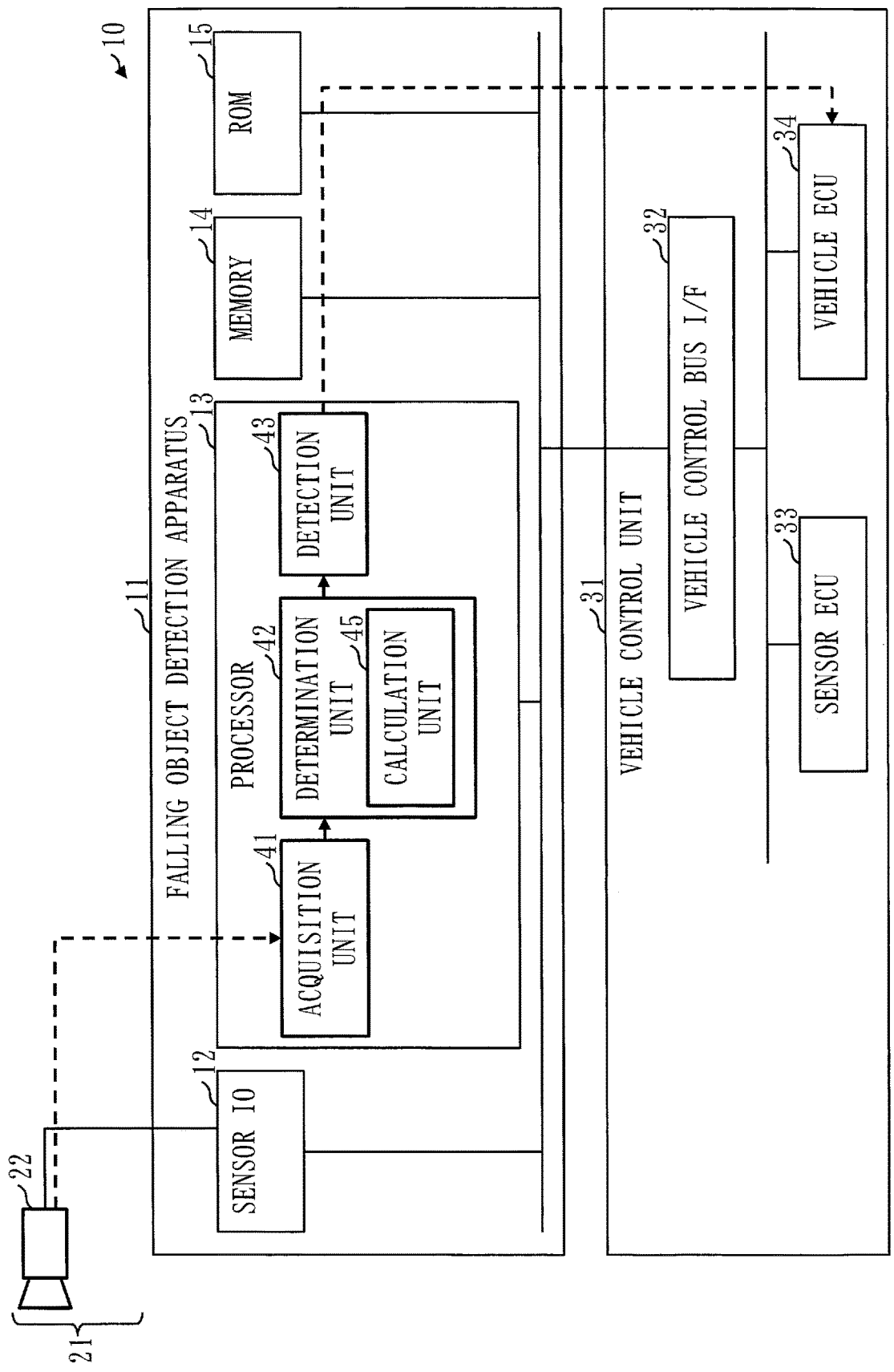
FIG. 6 is a block diagram illustrating a configuration of an in-vehicle system including a falling object detection apparatus according to a second embodiment.
Figure 7:
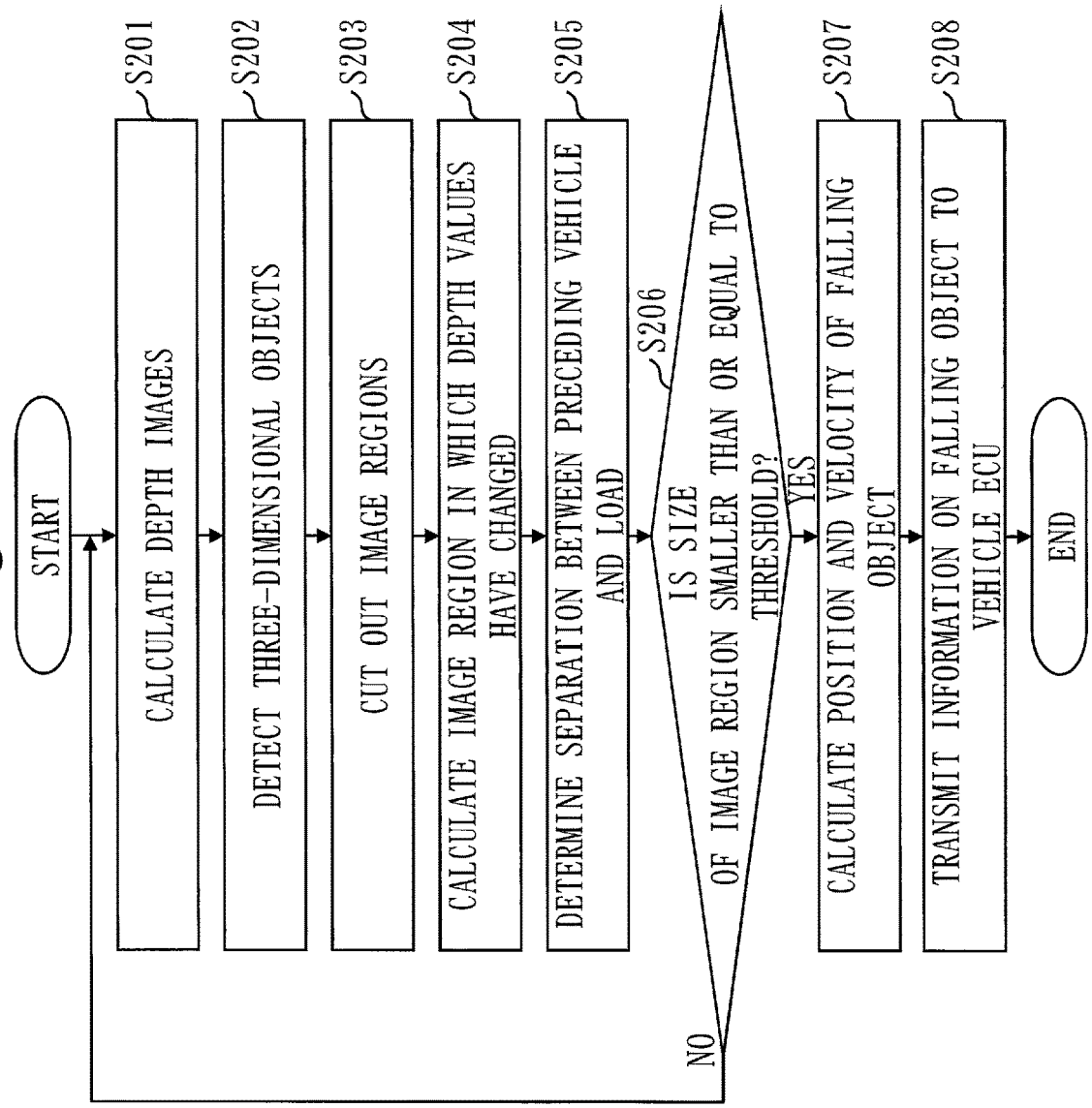
FIG. 7 is a flowchart illustrating operation of the falling object detection apparatus according to the second embodiment.
Figure 8:
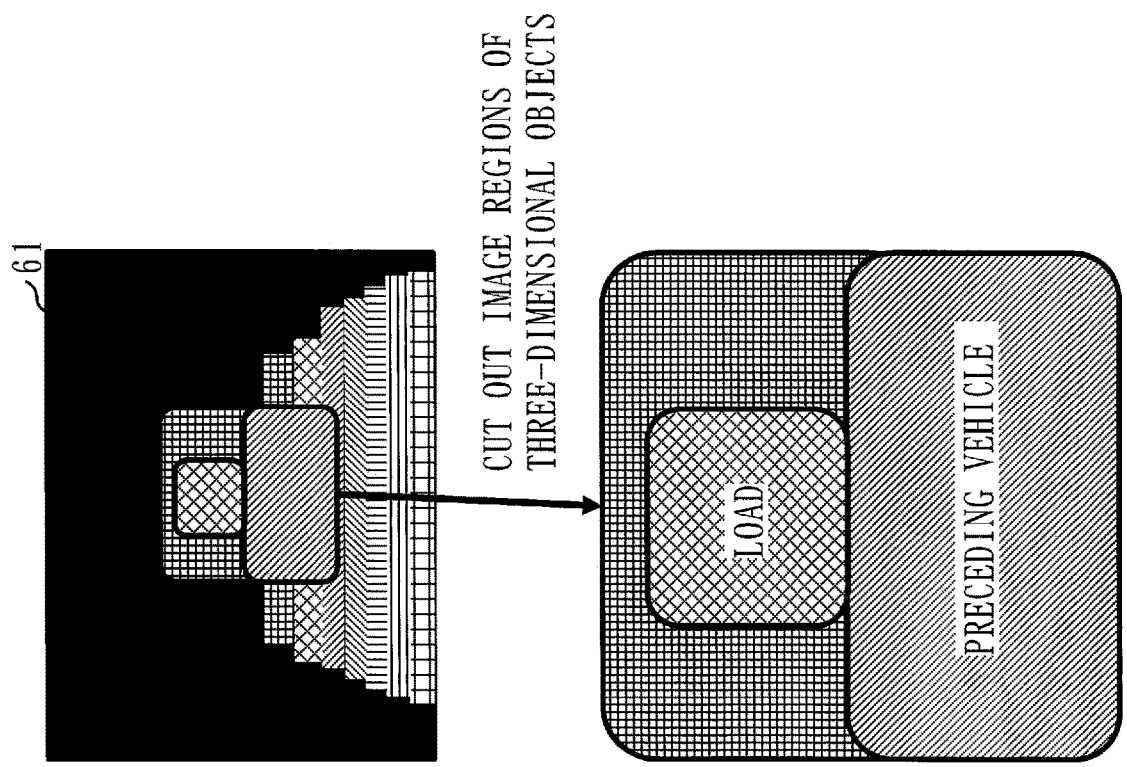
FIG. 8 is a diagram illustrating an example of image regions in a depth image according to the second embodiment.

Referring to FIGS. 6 to 8, differences from the first embodiment will be mainly described with regard to this embodiment.

Description of Configuration

Referring to FIG. 6, a configuration of the in-vehicle system 10 including the falling object detection apparatus 11 according to this embodiment will be described.

In this embodiment, the falling object detection apparatus 11 includes, as functional elements, the acquisition unit 41, the determination unit 42, and the detection unit 43. The determination unit 42 includes a calculation unit 45. The functions of the acquisition unit 41, the determination unit 42, and the detection unit 43 are realized by software.

In this embodiment, the falling object detection program is a program for causing a computer to execute the processes performed by the acquisition unit 41, the determination unit 42, and the detection unit 43, respectively, as an acquisition process, a determination process, and a detection process. That is, the falling object detection program is a program for realizing the functions of the acquisition unit 41, the determination unit 42, and the detection unit 43. The falling object detection program is loaded from the ROM 15 into the memory 14, read from the memory 14 into the processor 13, and executed by the processor 13, as in the first embodiment.

In this embodiment, the sensor devices 21 include at least the depth sensor 22.

Description of Operation

Referring to FIG. 6 and also FIGS. 7 and 8, operation of the falling object detection apparatus 11 according to this embodiment will be described. The operation of the falling object detection apparatus 11 is equivalent to a falling object detection method according to this embodiment.

In this embodiment, the falling object detection apparatus 11 refers to the size of an image region in a depth image 61 in which there has been a change, so as to determine the separation between the second vehicle 52 and the load 53. With this arrangement, even when the load 53 falls from the second vehicle 52, the load 53 that is falling or may fall can be immediately detected so that the first vehicle 51 avoids this falling object, as in the first embodiment.

The operation of the falling object detection apparatus 11 will be described in detail.

In step S201 of FIG. 7, the acquisition unit 41 acquires depth images 61 of the second vehicle 52 and of the area around the second vehicle 52.

In steps S202 to S206 of FIG. 7, the determination unit 42 determines whether the load 53 has not made a movement different from that of the second vehicle 52, using the depth images 61 acquired by the acquisition unit 41. Specifically, in steps S202 to S204, the determination unit 42 calculates an image region in which the depth values have changed between the depth images 61 at a plurality of time points acquired by the acquisition unit 41. In steps S205 and S206, if the size of the calculated image region is different from a size corresponding to the second vehicle 52, the determination unit 42 determines that the load 53 has made a movement to separate from the second vehicle 52 as the "movement different from that of the second vehicle 52".

In steps S207 and S208 of FIG. 7, the detection unit 43 detects a fall of the load 53 based on the result of determination by the determination unit 42.

Note that, in steps S202 to S204, provided that the image region of the second vehicle 52 and the image region of the load 53 can be distinguished, the determination unit 42 may compare an amount of change in the depth values between the image regions of the second vehicle 52 with an amount of change in the depth values between the image regions of the load 53, in the depth images 61 at a plurality of time points acquired by the acquisition unit 41. In steps S205 and S206, the determination unit 42 may determine that the load 53 has made a movement to separate from the second vehicle 52 as the "movement different from that of the second vehicle 52" when a difference between the amounts of change exceeds a threshold.

Furthermore, even when the difference between the amounts of change is below the threshold, the determination unit 42 may determine that the load 53 is not fixed based on the difference in the amounts of change. In steps S207 and S208, when the determination unit 42 has determined that the load 53 is not fixed, the detection unit 43 may perform control to increase the distance between the first vehicle 51 and the second vehicle 52.

The operation of the falling object detection apparatus 11 will be described more specifically.

The process of step S201 is the same as the process of step S101 in the first embodiment, and thus specific description will be omitted.

The process of step S202 is the same as the process of step S102 in the first embodiment, and thus specific description will be omitted.

In step S203, the determination unit 42 cuts out image regions of the three-dimensional objects detected in step S202 from the depth image 61.

In step S204, the calculation unit 45 included in the determination unit 42 calculates an image region in which the depth values have changed in time series out of the image regions cut out in step S203.

In step S205, the determination unit 42 starts a process to determine the separation between the second vehicle 52 and the load 53, and refers to the image region in which the depth values have changed and distance information of the depth values, which are calculated in step S204, so as to calculate the actual size of the object captured in the image region. In calculating the actual size of the object, the position in the Z-axis direction is calculated based on the distance information, the positions in the X-axis direction and the Y-axis direction are calculated based on the depth images 61 and the distance information, and the actual size of the object corresponding to the image region is determined based on these positions. As described above, the X-axis direction corresponds to the lateral direction of the vehicle, the Y-axis direction corresponds to the height direction of the vehicle, and the Z-axis direction corresponds to the traveling direction of the vehicle.

In step S206, if the size calculated in step S205 is smaller than or equal to a threshold corresponding to the size of the vehicle, the determination unit 42 infers that the depth values have changed due to a fall of the load 53, thereby determining that the second vehicle 52 and the load 53 are separated, and proceeds to step S207. If the size calculated in step S205 is greater than the threshold corresponding to the size of the vehicle, the determination unit 42 presumes that the depth values have changed simply due to a change in the inter-vehicle distance between the first vehicle 51 and the second vehicle 52, thereby determining that the second vehicle 52 and the load 53 are not separated, and returns to step S201.

FIG. 8 illustrates an example of image regions in a depth image 61. In this example, the pixels of the depth image 61 are displayed in colors that vary depending on the distance, as in FIG. 3. The colors are indicated by hatching patterns for convenience.

The upper diagram in FIG. 8 illustrates the depth image 61. The lower diagram in FIG. 8 illustrates image regions of three-dimensional objects cut out from the depth image 61 of the above diagram. When the inter-vehicle distance between the first vehicle 51 and the second vehicle 52 changes, the depth values of the image region of the second vehicle 52 change. When the distance between the first vehicle 51 and the load 53 changes, the depth values of the image region of the load 53 change. Therefore, the separation between the second vehicle 52 and the load 53 can be determined with reference to the size of the image region in which the depth values have changed.

Note that the determination unit 42 may refer to changes in the depth values of the entire depth image 61 without cutting out image regions of three-dimensional objects so as to determine the separation between the second vehicle 52 and the load 53, instead of cutting out image regions of three-dimensional objects and then referring to changes in the depth values so as to determine the separation between the second vehicle 52 and the load 53.

The process of step S207 is the same as the process of step S107 in the first embodiment, and thus specific description will be omitted.

The process of step S208 is the same as the process of step S108 in the first embodiment, and thus specific description will be omitted.

With the above operation, even when the load 53 falls from the second vehicle 52, the load 53 that is falling can be immediately detected, so that collision with a falling object can be avoided.

In this embodiment, the determination unit 42 determines the separation between the second vehicle 52 and the load 53 based only on the size of the image region in which the depth values have changed, so that it is not necessary to distinguish the image region of the second vehicle 52 and the image region of the load 53 in advance.

Note that the determination unit 42 may refer to the depth images 61 and distinguish the image region of the second vehicle 52 and the image region of the load 53 in advance. The determination unit 42 may determine that the second vehicle 52 and the load 53 are not separated when an amount of change in the depth values in the image region of the second vehicle 52 and an amount of change in the depth values in the image region of the load 53 are approximately the same, and determine that the second vehicle 52 and the load 53 are separated when a difference between the amounts of change in the depth values is greater than or equal to any given threshold.

Even when the difference in the amounts of change in the depth values is smaller than the given threshold, if a state in which there is a difference in the amounts of change in the depth values continues, the determination unit 42 may infer that the load 53 is not fixed to the second vehicle 52 and determine that the probability that the load 53 will fall is high. If the probability of a fall is high, the detection unit 43 may control the first vehicle 51, via the vehicle ECU 34, to increase the inter-vehicle distance to the second vehicle 52.

Description of Effects of Embodiment

In this embodiment, a fall of the load 53 is detected based on the result of determination as to whether the load 53 on the preceding vehicle has not made a movement different from that of the preceding vehicle, using the depth images 61 of the preceding vehicle and of the area around the preceding vehicle, as in the first embodiment. Therefore, a fall of the load 53 from the preceding vehicle can be immediately detected.

Unlike the first embodiment, a distance sensor such as a millimeter wave sensor is not required in this embodiment.

Other Configurations

In this embodiment, the functions of the acquisition unit 41, the determination unit 42, and the detection unit 43 are realized by software. As a variation, however, the functions of the acquisition unit 41, the determination unit 42, and the detection unit 43 may be realized by hardware. With regard to this variation, differences from this embodiment will be mainly described.

Figure 9:
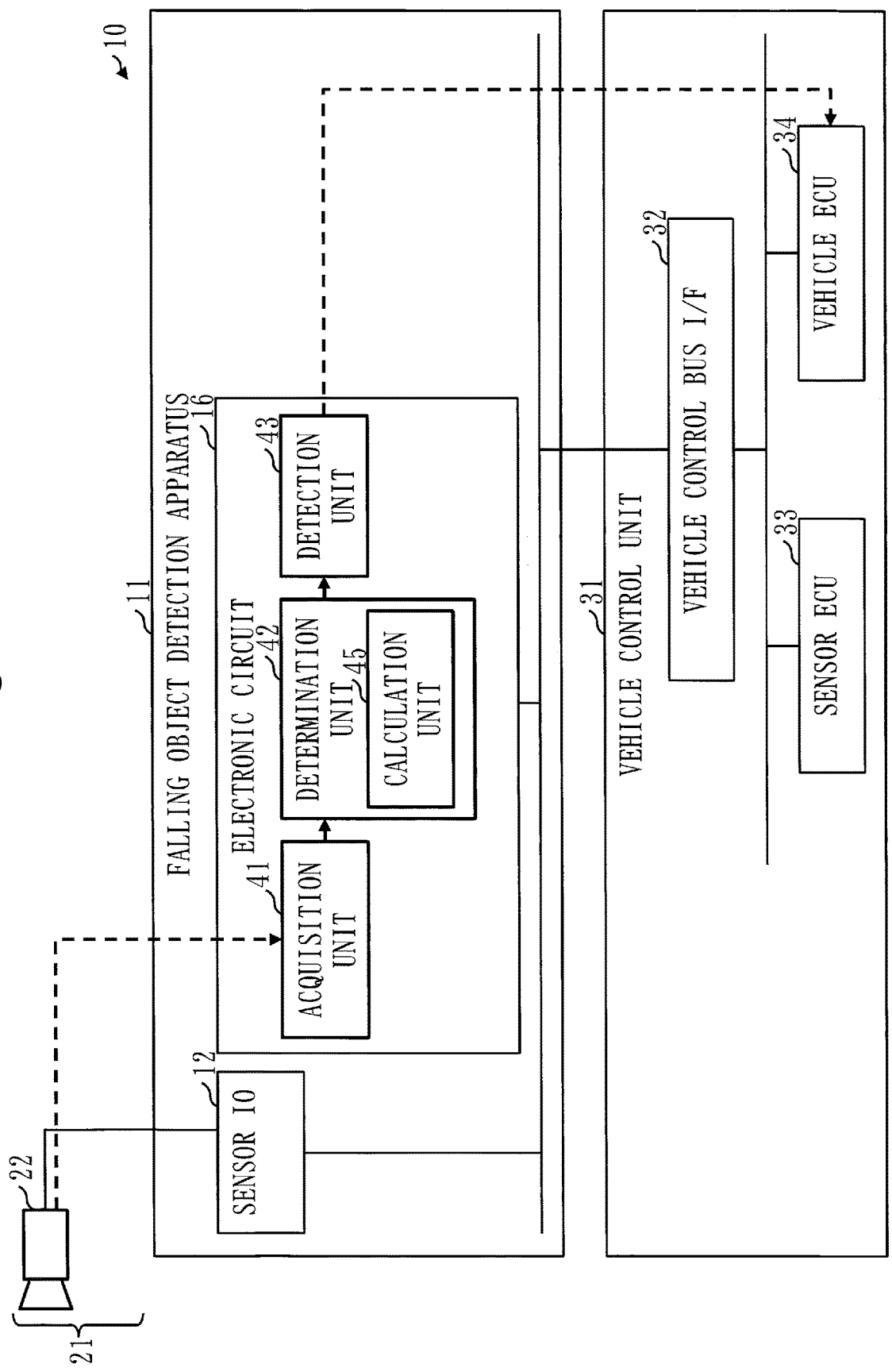
FIG. 9 is a block diagram illustrating a configuration of the in-vehicle system including the falling object detection apparatus according to a variation of the second embodiment.

Referring to FIG. 9, a configuration of the in-vehicle system 10 including the falling object detection apparatus 11 according to the variation of this embodiment will be described.

In this variation, the falling object detection apparatus 11 includes hardware, such as the electronic circuit 16 and the sensor JO 12.

The electronic circuit 16 is dedicated hardware that realizes the functions of the acquisition unit 41, the determination unit 42, and the detection unit 43. The electronic circuit 16 is, for example, a single circuit, a composite circuit, a programmed processor, a parallel-programmed processor, a logic IC, a GA, an FPGA, an ASIC, or a combination of some or all of these.

As another variation, the functions of the acquisition unit 41, the determination unit 42, and the detection unit 43 may be realized by a combination of software and hardware. That is, some of the functions of the acquisition unit 41, the determination unit 42, and the detection unit 43 may be realized by the dedicated hardware, and the rest of the functions may be realized by software.

The processor 13 and the electronic circuit 16 are both processing circuitry. That is, the operation of the acquisition unit 41, the determination unit 42, and the detection unit 43 is performed by the processing circuitry, regardless of whether the configuration of the falling object detection apparatus 11 is either of the configurations illustrated in FIGS. 6 and 9.

Third Embodiment Referring to FIGS. 10 to 15, differences from the first embodiment will be mainly described with regard to this embodiment.

Description of Configuration

Figure 10:
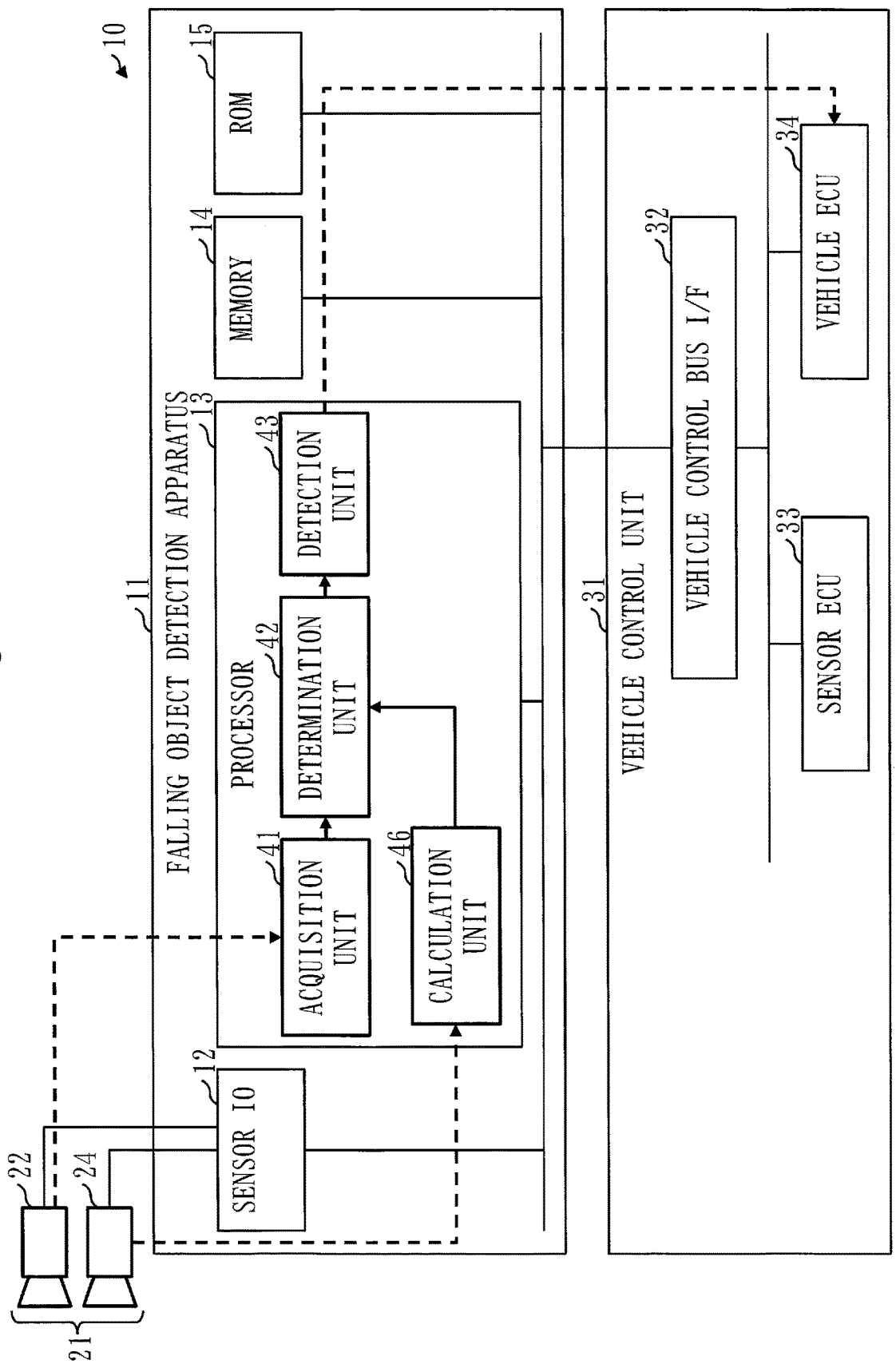
FIG. 10 is a block diagram illustrating a configuration of an in-vehicle system including a falling object detection apparatus according to a third embodiment.

Referring to FIG. 10, a configuration of the in-vehicle system 10 including the falling object detection apparatus 11 according to this embodiment will be described.

In this embodiment, the falling object detection apparatus 11 includes, as functional elements, the acquisition unit 41, the determination unit 42, the detection unit 43, and a calculation unit 46. The functions of the acquisition unit 41, the determination unit 42, the detection unit 43, and the calculation unit 46 are realized by software.

In this embodiment, a falling object detection program is a program for causing a computer to execute the processes performed by the acquisition unit 41, the determination unit 42, the detection unit 43, and the calculation unit 46, respectively, as an acquisition process, a determination process, a detection process, and a calculation process. That is, the falling object detection program is a program for realizing the functions of the acquisition unit 41, the determination unit 42, the detection unit 43, and the calculation unit 46. The falling object detection program is loaded from the ROM 15 into the memory 14, read from the memory 14 into the processor 13, and executed by the processor 13, as in the first embodiment.

In this embodiment, the sensor devices 21 include at least the depth sensor 22 and a camera 24.

Description of Operation

Referring to FIG. 10 and also FIGS. 11 to 15, operation of the falling object detection apparatus 11 according to this embodiment will be described. The operation of the falling object detection apparatus 11 is equivalent to a falling object detection method according to this embodiment.

In this embodiment, the falling object detection apparatus 11 refers to changes in depth images 61 and optical flow to determine the separation between the second vehicle 52 and the load 53. With this arrangement, even when the load 53 falls from the second vehicle 52, the load 53 that is falling or may fall can be immediately detected so that the first vehicle 51 avoids this falling object, as in the first embodiment.

The operation of the falling object detection apparatus 11 will be described in detail.

Figure 11:
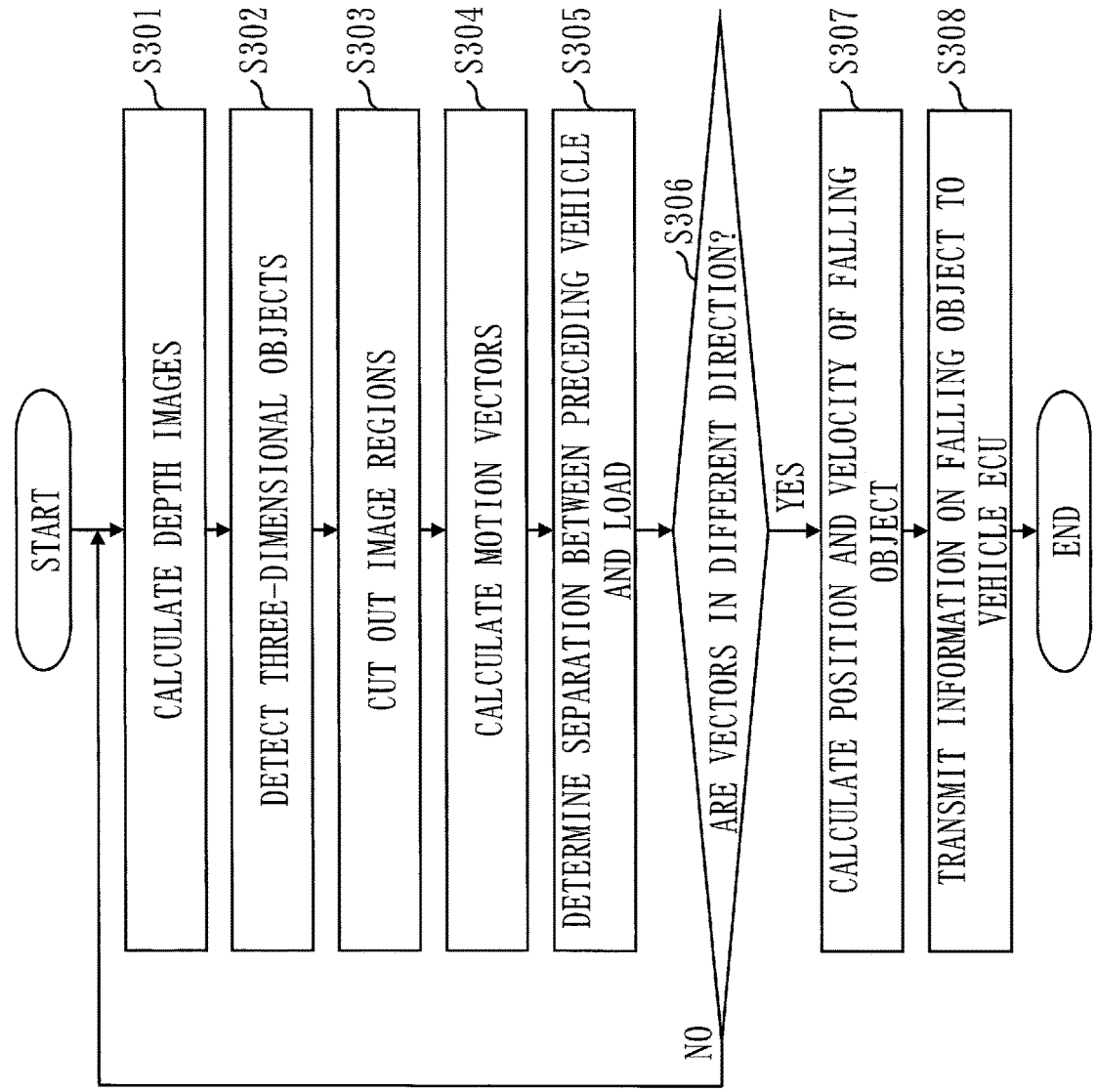
FIG. 11 is a flowchart illustrating operation of the falling object detection apparatus according to the third embodiment.

In step S301 of FIG. 11, the acquisition unit 41 acquires depth images 61 of the second vehicle 52 and of the area around the second vehicle 52.

In steps S302 to S306 of FIG. 11, the determination unit 42 determines whether the load 53 has not made a movement different from that of the second vehicle 52, using the depth images 61 acquired by the acquisition unit 41. Specifically, in step S304, the calculation unit 46 calculates motion vectors representing movements of objects between camera images at a plurality of time points obtained by photographing the second vehicle 52 and the area around the second vehicle 52. In steps S302, S303, S305, and S306, the determination unit 42 refers to the depth images 61 at the plurality of time points acquired by the acquisition unit 41 and determines whether the distance to the second vehicle 52 has increased. When the distance has increased, and if the motion vectors calculated by the calculation unit 46 are downward vectors, the determination unit 42 determines that the load 53 has made a movement to separate from the second vehicle 52 as the "movement different from that of the second vehicle 52".

In steps S307 and S308 of FIG. 11, the detection unit 43 detects a fall of the load 53 based on the result of determination by the determination unit 42.

Note that, in step S306, even when the distance to the second vehicle 52 has decreased, if the motion vectors calculated by the calculation unit 46 are downward vectors and the magnitude of the vectors exceeds a threshold, the determination unit 42 may also determine that the load 53 has made a movement to separate from the second vehicle 52 as the "movement different from that of the second vehicle 52".

In step S306, even when the distance to the second vehicle 52 has decreased, if the motion vectors calculated by the calculation unit 46 are upward vectors, the determination unit 42 may also determine that the load 53 has made a movement to separate from the second vehicle 52 as the "movement different from that of the second vehicle 52".

The operation of the falling object detection apparatus 11 will be described more specifically.

The process of step S301 is the same as the process of step S101 in the first embodiment, and thus specific description will be omitted.

The process of step S302 is the same as the process of step S102 in the first embodiment, and thus specific description will be omitted.

In step S303, the determination unit 42 cuts out, from the depth images 61, image regions of the three-dimensional objects detected in step S302.

In step S304, the calculation unit 46 captures two-dimensional images of the area in front of the first vehicle 51, using the camera 24 out of the sensor devices 21, and calculates motion vectors based on time-series data of the obtained camera images. That is, based on the images captured by the camera 24, the calculation unit 46 calculates motion vectors representing time-series changes in the images. A motion vector is also referred to as optical flow.

As a method for calculating motion vectors, a method for calculating sparse optical flow may be used, or a method for calculating dense optical flow may be used.

In the method for calculating sparse optical flow, a feature point is detected from camera images, and a direction of motion and an amount of motion of the motion of the feature point in the time-series camera images are calculated. A feature point is a point where there are changes in luminance in a neighborhood image region. Feature points are detected using a technique such as corner detection. An example of the method for calculating sparse optical flow is the KLT method. "KLT" is an abbreviation for Kanade-Lucas-Tomasi. In the method for calculating dense optical flow, motion vectors of all pixels of a camera image are calculated. An example of the method for calculating dense optical flow is a method described in Non-Patent Literature 3.

In step S305, the determination unit 42 starts a process to determine the separation between the second vehicle 52 and the load 53, and refers to the motion vectors calculated in step S304 to determine whether downward motion vectors have been generated. If downward motion vectors have been generated, the determination unit 42 refers to the depth images 61 calculated in step S301 to determine whether the inter-vehicle distance has decreased.

In step S306, if it is determined in step S305 that downward motion vectors have been generated but the inter-vehicle distance has not decreased, the determination unit 42 infers that the downward motion vectors have been generated due to a fall of the load 53, thereby determining that the second vehicle 52 and the load 53 are separated, and proceeds to step S307. If it is determined in step S305 that no downward motion vector has been generated, or that downward motion vectors have been generated and the inter-vehicle distance has decreased, the determination unit 42 determines that the second vehicle 52 and the load 53 are not separated, and returns to step S301.

As described above, the determination unit 42 refers to time-series changes in the depth images 61 calculated by the acquisition unit 41 as well as the motion vectors calculated by the calculation unit 46 so as to determine the separation between the second vehicle 52 and the load 53. Motion vectors are generated when there is a moving object in time-series camera images. Motion vectors are generated when the load 53 has moved as a result of falling from the second vehicle 52. In addition, motion vectors are also generated when the inter-vehicle distance between the first vehicle 51 and the second vehicle 52 has changed. Therefore, it is necessary to determine whether the motion vectors are due to a fall of the load 53 or due to a change in the inter-vehicle distance.

FIGS. 12 to 15 illustrate examples of time-series camera images and motion vectors calculated based on the camera images.

Figure 12:
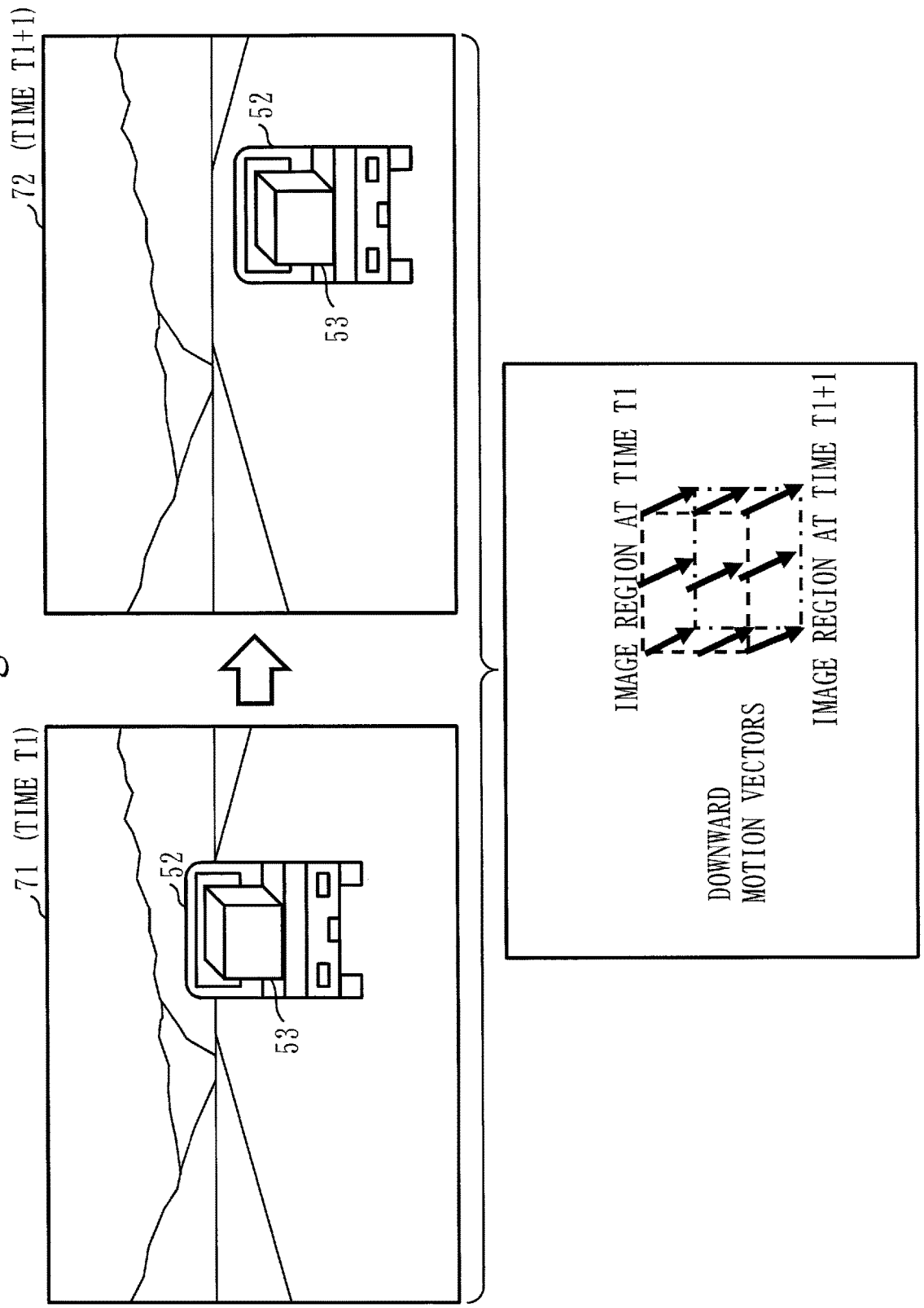
FIG. 12 is a diagram illustrating an example of camera images and motion vectors according to the third embodiment.

When the inter-vehicle distance between the first vehicle 51 and the second vehicle 52 decreases, downward motion vectors are usually generated in the image region of the second vehicle 52, as in the example in FIG. 12. When the inter-vehicle distance increases, upward motion vectors are usually generated in the image region of the second vehicle 52, as in the example in FIG. 13. A change in the inter-vehicle distance can also be calculated based on the depth images 61. Therefore, when it is determined with reference to the depth images 61 that the inter-vehicle distance has not decreased, but downward motion vectors have been generated, as in the example in FIG. 14, the determination unit 42 determines that the second vehicle 52 and the load 53 are separated. When it is determined with reference to the depth images 61 that the inter-vehicle distance has decreased, and if downward motion vectors have been generated, the determination unit 42 infers that the downward motion vectors are due to a change in the inter-vehicle distance, thereby determining that the second vehicle 52 and the load 53 are not separated.

The determination unit 42 may calculate an amount of change of downward motion vectors based on a change in the inter-vehicle distance, and determine that the second vehicle 52 and the load 53 are separated when downward motion vectors sufficiently larger than the amount of change are detected.

The examples in FIGS. 12 to 15 will be described in detail.

FIG. 12 illustrates motion vectors usually generated when the inter-vehicle distance decreases. The upper left diagram in FIG. 12 illustrates a camera image 71 at time point T1. The upper right diagram in FIG. 12 illustrates a camera image 72 at time point T1+1. The lower diagram in FIG. 12 illustrates motion vectors calculated based on the camera image 71 at time point T1 and the camera image 72 at time point T1+1. When the inter-vehicle distance between the first vehicle 51 and the second vehicle 52 decreases, the image region of the second vehicle 52 moves downward in the captured image, so that downward motion vectors are generated.

Figure 13:
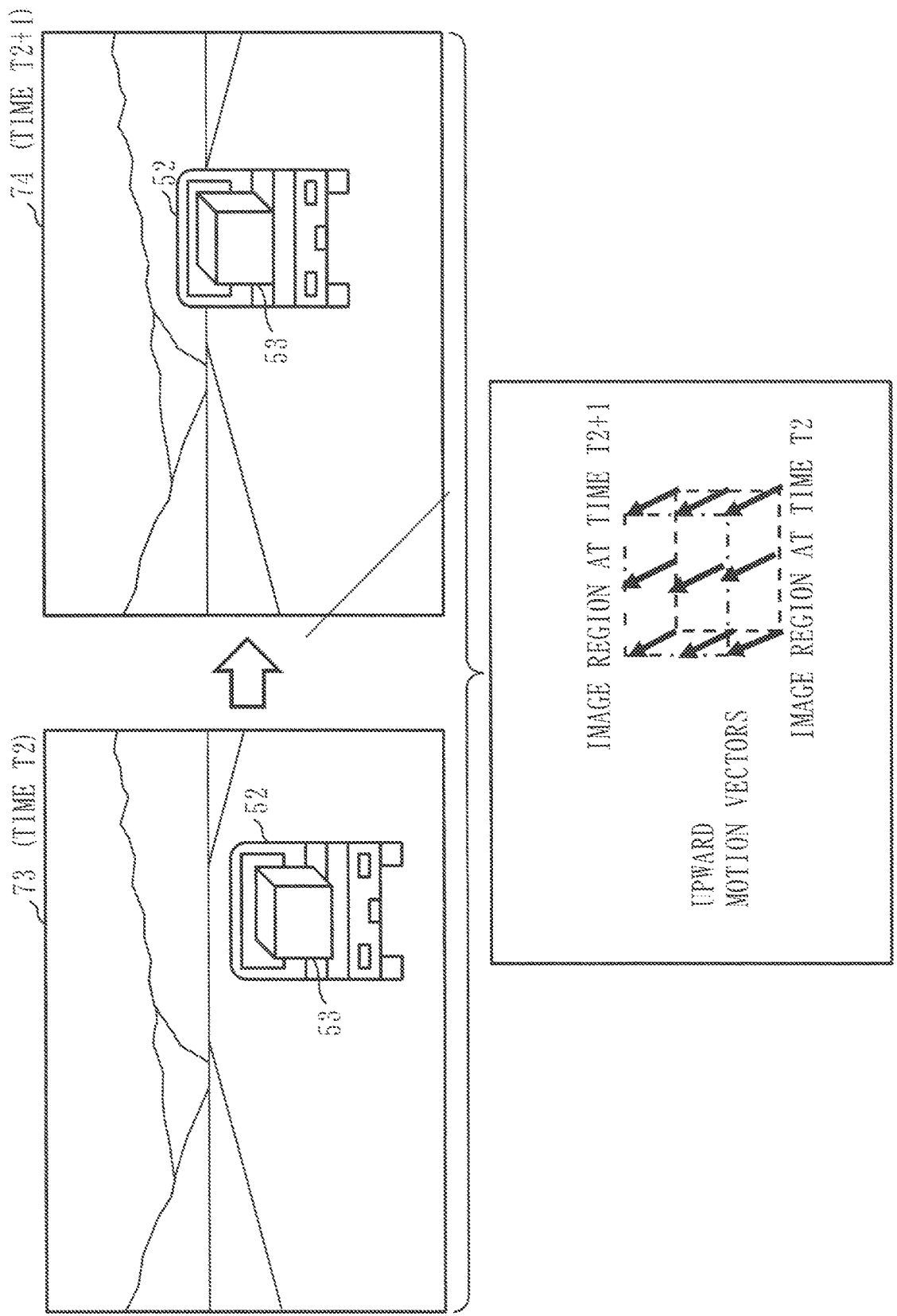
FIG. 13 is a diagram illustrating an example of camera images and motion vectors according to the third embodiment.

FIG. 13 illustrates motion vectors usually generated when the inter-vehicle distance increases. The upper left diagram in FIG. 13 illustrates a camera image 73 at time point T2. The upper right diagram in FIG. 13 illustrates a camera image 74 at time point T2+1. The lower diagram in FIG. 13 illustrates motion vectors calculated based on the camera image 73 at time point T2 and the camera image 74 at time point T2+1. When the inter-vehicle distance between the first vehicle 51 and the second vehicle 52 increases, the image region of the second vehicle 52 moves upward in the captured image, so that upward motion vectors are generated.

Figure 14:
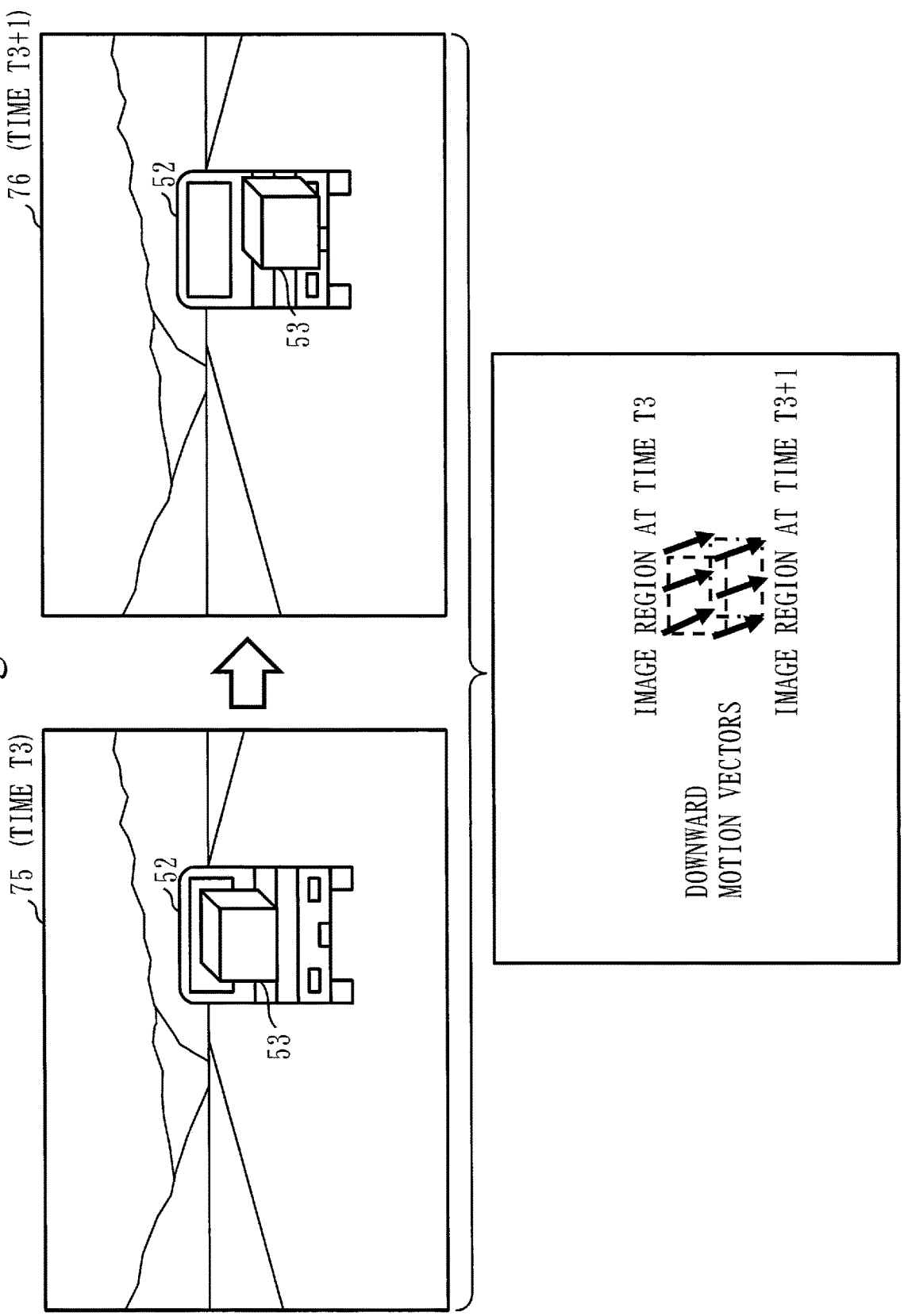
FIG. 14 is a diagram illustrating an example of camera images and motion vectors according to the third embodiment.

FIG. 14 illustrates motion vectors associated with a fall of the load 53. The upper left diagram in FIG. 14 illustrates a camera image 75 at time point T3. The upper right diagram in FIG. 14 illustrates a camera image 76 at time point T3+1. The lower diagram in FIG. 14 illustrates motion vectors calculated based on the camera image 75 at time point T3 and the camera image 76 at time point T3+1. It is assumed that there is no change in the inter-vehicle distance between the first vehicle 51 and the second vehicle 52. When the load 53 falls from the second vehicle 52, the image region of the load 53 moves downward in the captured image, so that downward motion vectors are generated.

As described above, since the inter-vehicle distance can be calculated based on the depth images 61, the determination unit 42 determines that the load 53 has fallen from the second vehicle 52 when downward motion vectors are detected while the inter-vehicle distance has increased or remains the same.

The load 53 that has fallen from the second vehicle 52 may collide with the road surface and bounce up.

Figure 15:
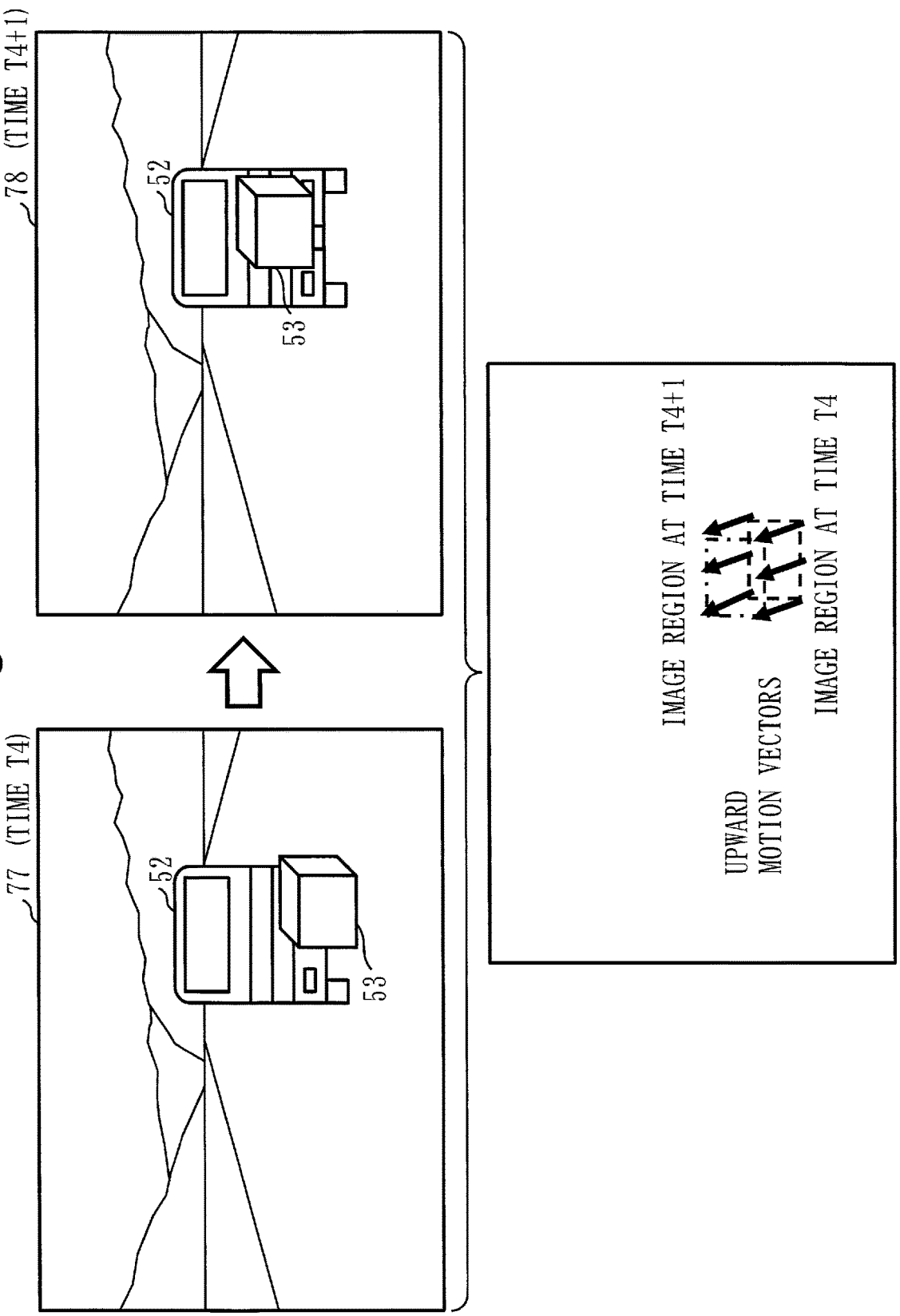
FIG. 15 is a diagram illustrating an example of camera images and motion vectors according to the third embodiment.

FIG. 15 illustrates motion vectors associated with bouncing up of the load 53. The upper left diagram in FIG. 15 illustrates a camera image 77 at time point T4. The upper right diagram in FIG. 15 illustrates a camera image 78 at time point T4+1. The lower diagram in FIG. 15 illustrates motion vectors calculated based on the camera image 77 at time point T4 and the camera image 78 at time point T4+1. It is assumed that there is no change in the inter-vehicle distance between the first vehicle 51 and the second vehicle 52. When the load 53 bounces up, the image region of the load 53 moves upward in the captured image, so that upward motion vectors are generated.

As described above, since the inter-vehicle distance can be calculated based on the depth images 61, the determination unit 42 may determine that the load 53 has fallen from the second vehicle 52 and then bounced up if upward motion vectors are detected while the inter-vehicle distance has decreased or remains the same. That is, the determination unit 42 may determine that the load 53 is separated from the second vehicle 52 when motion vectors in a direction different from that of motion vectors due to a change in the inter-vehicle distance are detected in the image region of the second vehicle 52.

The process of step S307 is the same as the process of step S107 in the first embodiment, and thus specific description will be omitted.

The process of step S308 is the same as the process of step S108 in the first embodiment, and thus specific description will be omitted.

With the above operation, even when the load 53 falls from the second vehicle 52, the load 53 that is falling can be immediately detected, so that collision with a falling object can be detected.

Description of Effects of Embodiment

In this embodiment, a fall of the load 53 is detected based the result of determination as to whether the load 53 on the preceding vehicle has not made a movement different from that of the preceding vehicle, using the depth images 61 of the preceding vehicle and of the area around the preceding vehicle, as in the first embodiment. Therefore, a fall of the load 53 from the preceding vehicle can be immediately detected.

In this embodiment, although the camera 24 is required unlike in the first embodiment, a distance sensor such as a millimeter wave sensor is not required. Note that instead of providing the camera 24 separately from the depth sensor 22, the camera 24 may be provided so as to also serve as the component element of the depth sensor 22.

Other Configurations

In this embodiment, the functions of the acquisition unit 41, the determination unit 42, the detection unit 43, and the calculation unit 46 are realized by software. As a variation, however, the functions of the acquisition unit 41, the determination unit 42, the detection unit 43, and the calculation unit 46 may be realized by hardware. With regard to this variation, differences from this embodiment will be mainly described.

Figure 16:
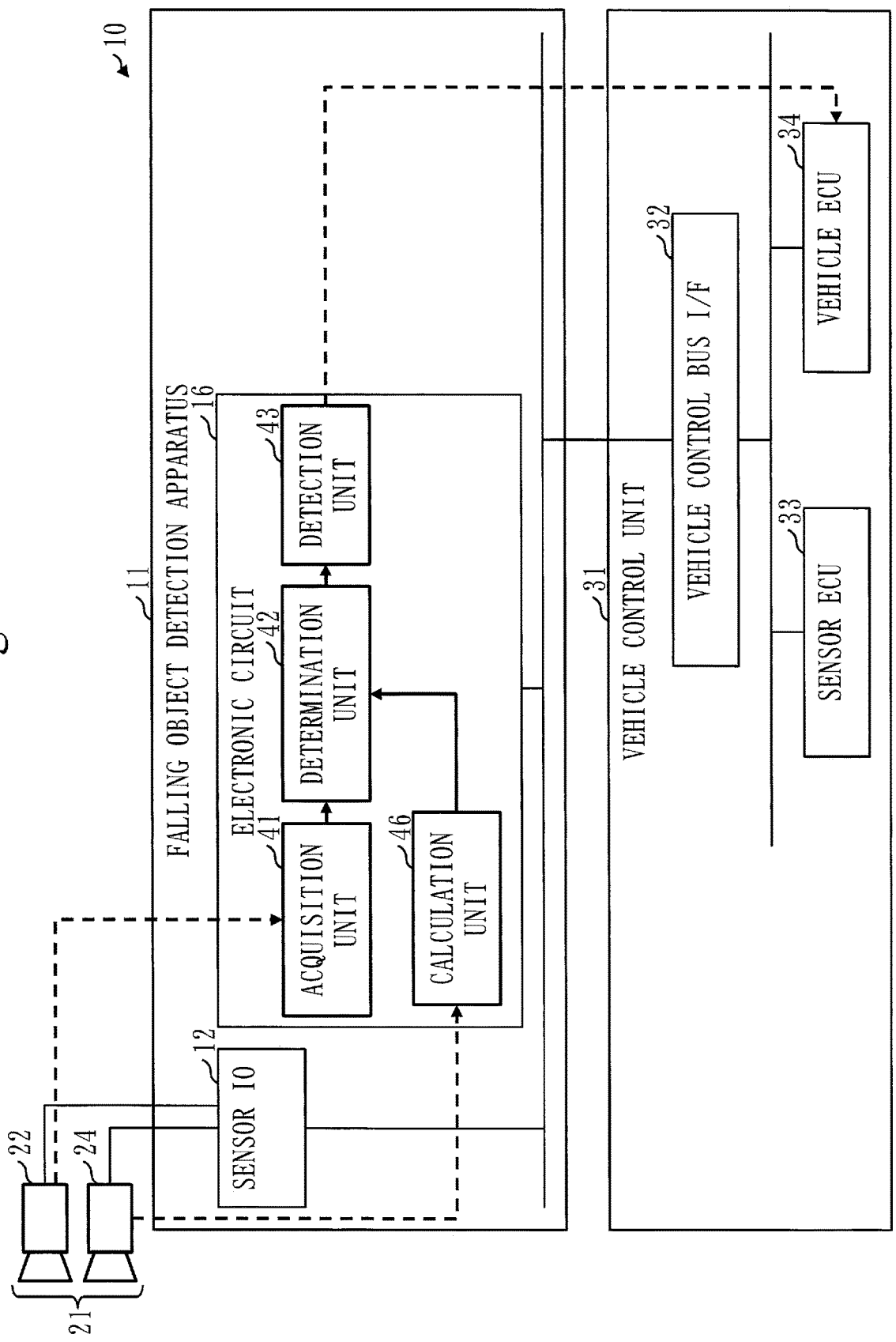
FIG. 16 is a block diagram illustrating a configuration of the in-vehicle system including the falling object detection apparatus according to a variation of the third embodiment.

Referring to FIG. 16, a configuration of the in-vehicle system 10 including the falling object detection apparatus 11 according to the variation of this embodiment will be described.

In this variation, the falling object detection apparatus 11 includes hardware, such as the electronic circuit 16 and the sensor IO 12.

The electronic circuit 16 is dedicated hardware that realizes the functions of the acquisition unit 41, the determination unit 42, the detection unit 43, and the calculation unit 46. The electronic circuit 16 is, for example, a single circuit, a composite circuit, a programmed processor, a parallel-programmed processor, a logic IC, a GA, an FPGA, an ASIC, or a combination of some or all of these.

As another variation, the functions of the acquisition unit 41, the determination unit 42, the detection unit 43, and the calculation unit 46 may be realized by a combination of software and hardware. That is, some of the functions of the acquisition unit 41, the determination unit 42, the detection unit 43, and the calculation unit 46 may be realized by the dedicated hardware, and the rest of the functions may be realized by software.

The processor 13 and the electronic circuit 16 are both processing circuitry. That is, the operation of the acquisition unit 41, the determination unit 42, the detection unit 43, and the calculation unit 46 is performed by the processing circuitry, regardless of whether the configuration of the falling object detection apparatus 11 is either of the configurations illustrated in FIGS. 10 and 16.

When two or more of the first to third embodiments are implemented in combination, the embodiment to be used may be different according to the inter-vehicle distance. For example, by adopting the operation of the first embodiment when the inter-vehicle distance is long and adopting the operation of the second embodiment when the inter-vehicle distance is short, occurrence of false determinations can be prevented more easily.

REFERENCE SIGNS LIST

10: in-vehicle system, 11: falling object detection apparatus, 12: sensor IO, 13: processor, 14: memory, 15: ROM, 16: electronic circuit, 21: sensor device, 22: depth sensor, 23: distance sensor, 24: camera, 31: vehicle control unit, 32:

vehicle control bus interface, 33: sensor ECU, 34: vehicle ECU, 41: acquisition unit, 42: determination unit, 43: detection unit, 44: measurement unit, 45: calculation unit, 46: calculation unit, 51: first vehicle, 52: second vehicle, 53: load, 61: depth image, 71: camera image, 72: camera image, 73: camera image, 74: camera image, 75: camera image, 76: camera image, 77: camera image, 78: camera image

The invention claimed is:

1. A falling object detection apparatus that is installed and used in a first vehicle, the falling object detection apparatus comprising:
processing circuitry to:
acquire a depth image of a second vehicle, on which a load is mounted and which is traveling in front of the first vehicle, and of an area around the second vehicle;
measure, using a distance sensor, a distance to the second vehicle;
calculate, by referring to the depth image, a distance to the load mounted on the second vehicle;
determine a difference between the distance to the second vehicle and the distance to the load;
make a determination as to whether the load has not made a movement different from a movement of the second vehicle based on the determined difference; and
detect a fall of the load based on a result of the determination.

2. The falling object detection apparatus according to claim 1, wherein
when the difference in the distances exceeds a threshold, the processing circuitry determines that the load has made a movement to separate from the second vehicle as the movement different from the movement of the second vehicle.

3. The falling object detection apparatus according to claim 2, wherein the processing circuitry uses a millimeter wave sensor as the distance sensor.

4. An in-vehicle system comprising:
the falling object detection apparatus according to claim 1; and
a vehicle control unit to control driving of the first vehicle.

5. A vehicle in which the falling object detection apparatus according to claim 1 is installed.

6. A falling object detection apparatus that is installed and used in a first vehicle, the falling object detection apparatus comprising:
processing circuitry to:
acquire a depth image of a second vehicle, on which a load is mounted and which is traveling in front of the first vehicle, and of an area around the second vehicle;
make a determination as to whether the load has not made a movement different from a movement of the second vehicle, using the acquired depth image by comparing an amount of change in a depth value between image regions of the second vehicle with an amount of change in a depth value between image regions of the load, in depth images acquired at a plurality of time points, and determining, when a difference between the amounts of change exceeds a threshold, that the load has made a movement to separate from the second vehicle as the movement different from the movement of the second vehicle; and
detect a fall of the load based on a result of the determination.

7. The falling object detection apparatus according to claim 6,
wherein even when the difference between the amounts of change is below the threshold, the processing circuitry determines that the load is not fixed based on the difference in the amounts of change, and
wherein when it has been determined that the load is not fixed, the processing circuitry performs control to increase a distance between the first vehicle and the second vehicle.

8. A falling object detection apparatus that is installed and used in a first vehicle, the falling object detection apparatus comprising:
processing circuitry to:
acquire, using a depth sensor, a depth image of a second vehicle, on which a load is mounted and which is traveling in front of the first vehicle, and of an area around the second vehicle;
make a determination as to whether the load has not made a movement different from a movement of the second vehicle, using the acquired depth image by calculating a motion vector representing a movement of an object between camera images at a plurality of time points obtained by photographing the second vehicle and the area around the second vehicle, and referring to depth images acquired by the depth sensor at the plurality of time points and determining whether a distance to the second vehicle has increased, and when the distance has increased and when the calculated motion vector is a downward vector, determining that the load has made a movement to separate from the second vehicle as the movement different from the movement of the second vehicle; and
detect a fall of the load based on a result of the determination.

9. A falling object detection apparatus that is installed and used in a first vehicle, the falling object detection apparatus comprising:
processing circuitry to:
acquire, using a depth sensor, a depth image of a second vehicle, on which a load is mounted and which is traveling in front of the first vehicle, and of an area around the second vehicle;
make a determination as to whether the load has not made a movement different from a movement of the second vehicle, using the acquired depth image by calculating a motion vector representing a movement of an object between camera images at a plurality of time points obtained by photographing the second vehicle and the area around the second vehicle, and referring to depth images acquired using the depth sensor at the plurality of time points and determining whether a distance to the second vehicle has increased, and when the distance has decreased and when the calculated motion vector is a downward vector and a magnitude of the vector exceeds a threshold, determining that the load has made a movement to separate from the second vehicle as the movement different from the movement of the second vehicle; and
detect a fall of the load based on a result of the determination.

10. A falling object detection apparatus that is installed and used in a first vehicle, the falling object detection apparatus comprising:

processing circuitry to:
  acquire, using a depth sensor, a depth image of a second vehicle, on which a load is mounted and which is traveling in front of the first vehicle, and of an area around the second vehicle;
  make a determination as to whether the load has not made a movement different from a movement of the second vehicle, using the acquired depth image by
    calculating a motion vector representing a movement of an object between camera images at a plurality of time points obtained by photographing the second vehicle and the area around the second vehicle, and
    referring to depth images acquired using the depth sensor at the plurality of time points and determining whether a distance to the second vehicle has increased, and when the distance has decreased and when the calculated motion vector is an upward vector, determining that the load has made a movement to separate from the second vehicle as the movement different from the movement of the second vehicle; and
  detect a fall of the load based on a result of the determination.

11. A non-transitory computer readable medium storing a falling object detection program for causing a computer installed and used in a first vehicle to execute one or more processing to:
  acquire a depth image of a second vehicle, on which a load is mounted and which is traveling in front of the first vehicle, and of an area around the second vehicle;
  measure, using a distance sensor, a distance to the second vehicle;
  calculate, by referring to the depth image, a distance to the load mounted on the second vehicle;
  determine a difference between the distance to the second vehicle and the distance to the load;
  determine whether the load has not made a movement different from a movement of the second vehicle based on the determined difference; and
  detect a fall of the load based on a result of determination by the determination process.

* * * * *